(12) United States Patent
Mori et al.

(10) Patent No.: US 11,341,608 B2
(45) Date of Patent: May 24, 2022

(54) INFORMATION PROCESSING DEVICE, INFORMATION PROCESSING METHOD, INFORMATION PROCESSING PROGRAM, IMAGE PROCESSING DEVICE, AND IMAGE PROCESSING SYSTEM FOR ASSOCIATING POSITION INFORMATION WITH CAPTURED IMAGES

(71) Applicant: SONY CORPORATION, Tokyo (JP)

(72) Inventors: Hiroshi Mori, Tokyo (JP); Hiroyuki Sano, Tokyo (JP); Hideo Miyamaki, Tokyo (JP); Masato Tsujie, Kanagawa (JP); Yoichiro Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/607,006

(22) PCT Filed: Mar. 27, 2018

(86) PCT No.: PCT/JP2018/012289
§ 371 (c)(1),
(2) Date: Oct. 21, 2019

(87) PCT Pub. No.: WO2018/198634
PCT Pub. Date: Nov. 1, 2018

(65) Prior Publication Data
US 2020/0134783 A1    Apr. 30, 2020

(30) Foreign Application Priority Data

Apr. 28, 2017   (JP) .............................. JP2017-090763
Feb. 15, 2018   (JP) .............................. JP2018-024840

(51) Int. Cl.
G06K 9/32      (2006.01)
G06T 3/40      (2006.01)
H04N 5/232     (2006.01)

(52) U.S. Cl.
CPC ........ *G06T 3/4038* (2013.01); *H04N 5/23299* (2018.08); *H04N 5/232061* (2018.08)

(58) Field of Classification Search
CPC ............ G06T 3/4038; H04N 5/232061; H04N 5/23299
See application file for complete search history.

(56) References Cited

U.S. PATENT DOCUMENTS 2,791,151 A * 5/1957 Pennington ............ G01C 11/00
353/6
3,251,283 A * 5/1966 Wood ..................... G03B 15/00
396/10

(Continued)

FOREIGN PATENT DOCUMENTS

CN      102255259 A     11/2011
CN      102840852 A     12/2012
(Continued)

OTHER PUBLICATIONS

Unmanned Aerial vehicle data acquisition—Hurricane Events, Stuart Adams et al., ResearchGate, Jan. 2010, pp. 1-7 (Year: 2010).*

(Continued)

*Primary Examiner* — Jayesh A Patel
(74) *Attorney, Agent, or Firm* — Oblon, McClelland, Maier & Neustadt, L.L.P.

(57) ABSTRACT

Provided is an information processing device configured to: acquire an image captured according to an imaging instruction by an imaging device mounted to a mobile object; acquire sensor information including position information about the mobile object from a sensor device according to a signal transmitted from the imaging device in response to the imaging instruction; and associate the acquired sensor information with the acquired image.

25 Claims, 28 Drawing Sheets

(56) References Cited

U.S. PATENT DOCUMENTS

| | | | | |
|---|---|---|---|---|
| 3,992,707 | A * | 11/1976 | Schmidtlein | G01S 7/10 |
| | | | | 342/58 |
| 8,624,959 | B1 * | 1/2014 | Houck, II | H04N 13/221 |
| | | | | 348/42 |
| 9,554,123 | B2 * | 1/2017 | Rhoads | G06T 15/04 |
| 9,911,189 | B1 * | 3/2018 | Vawter | G01S 17/89 |
| 10,084,960 | B2 * | 9/2018 | Pettegrew | H04N 5/3572 |
| 10,217,283 | B2 * | 2/2019 | Dillard | G06T 19/003 |
| 10,364,027 | B2 * | 7/2019 | Loveland | B64C 39/024 |
| 10,419,675 | B2 * | 9/2019 | Kaida | G06K 9/4609 |
| 10,565,789 | B2 * | 2/2020 | Livens | G01J 3/2823 |
| 2008/0059065 | A1 * | 3/2008 | Strelow | G01S 19/14 |
| | | | | 701/448 |
| 2010/0026822 | A1 * | 2/2010 | Hahm | H04N 7/181 |
| | | | | 348/218.1 |
| 2010/0141735 | A1 * | 6/2010 | Yamashita | H04N 5/23238 |
| | | | | 348/36 |
| 2010/0328499 | A1 * | 12/2010 | Sun | H04N 5/23238 |
| | | | | 348/239 |
| 2012/0050524 | A1 * | 3/2012 | Rinner | G06T 3/40 |
| | | | | 348/117 |
| 2013/0051655 | A1 * | 2/2013 | Collard | G01S 7/4873 |
| | | | | 382/154 |
| 2014/0168420 | A1 * | 6/2014 | Naderhirn | F03D 80/50 |
| | | | | 348/128 |
| 2015/0187390 | A1 * | 7/2015 | Pacurariu | G11B 27/28 |
| | | | | 386/227 |
| 2015/0373267 | A1 * | 12/2015 | Lapstun | G03B 15/006 |
| | | | | 348/144 |
| 2016/0004795 | A1 * | 1/2016 | Novak | G06F 30/20 |
| | | | | 703/1 |
| 2016/0093212 | A1 * | 3/2016 | Barfield, Jr. | G08G 1/0133 |
| | | | | 348/144 |
| 2016/0105649 | A1 * | 4/2016 | Pettegrew | H04N 7/185 |
| | | | | 348/37 |
| 2016/0176542 | A1 * | 6/2016 | Wilkins | B64D 47/08 |
| | | | | 348/144 |
| 2016/0179096 | A1 * | 6/2016 | Bradlow | G05D 1/0669 |
| | | | | 701/8 |
| 2016/0286175 | A1 * | 9/2016 | Dvorak | B64D 47/08 |
| 2016/0292626 | A1 * | 10/2016 | Green | G06Q 50/02 |
| 2016/0321818 | A1 * | 11/2016 | Shorter | G01S 17/89 |
| 2016/0379369 | A1 * | 12/2016 | Sugaya | G06K 9/0063 |
| | | | | 382/103 |
| 2017/0076457 | A1 | 3/2017 | Hayashi et al. | |
| 2017/0158329 | A1 * | 6/2017 | Liu | A47L 1/02 |
| 2017/0169582 | A1 * | 6/2017 | Tanaka | G01N 21/84 |
| 2017/0289447 | A1 * | 10/2017 | Nakao | G06T 7/74 |
| 2017/0294002 | A1 * | 10/2017 | Jia | G06T 7/80 |
| 2017/0334559 | A1 * | 11/2017 | Bouffard | G08G 5/0082 |
| 2018/0033124 | A1 * | 2/2018 | Thomasson | B64C 39/024 |
| 2018/0109767 | A1 * | 4/2018 | Li | H04N 7/188 |
| 2018/0162530 | A1 * | 6/2018 | Klein | F41B 11/80 |
| 2019/0068952 | A1 * | 2/2019 | Nishita | G06T 7/73 |
| 2019/0128665 | A1 * | 5/2019 | Harendt | G06T 7/40 |
| 2019/0340811 | A1 * | 11/2019 | Livens | G01J 3/2823 |

FOREIGN PATENT DOCUMENTS

| | | | | |
|---|---|---|---|---|
| CN | 104853113 | A | | 8/2015 |
| CN | 104853113 | A | * | 8/2015 |
| JP | 8-159762 | A | | 6/1996 |
| JP | 9-298686 | A | | 11/1997 |
| JP | 2008-304260 | A | | 12/2008 |
| JP | 2008304260 | A | * | 12/2008 |
| JP | 2014-61 48 | A | | 1/2014 |
| JP | 2016-85100 | A | | 5/2016 |
| JP | 2016-223935 | A | | 12/2016 |
| JP | 2017-59861 | A | | 3/2017 |
| WO | WO 2015/163107 | A1 | | 10/2015 |
| WO | WO-2015163107 | A1 | * | 10/2015 ............ G01C 15/00 |
| WO | WO 2016/033754 | A1 | | 3/2016 |
| WO | WO 2016/131005 | A1 | | 8/2016 |
| WO | WO-2016131005 | A1 | * | 8/2016 ............ H04N 5/232 |
| WO | WO 2017/026337 | A1 | | 2/2017 |

OTHER PUBLICATIONS

Positional accuracy analysis of Flickr and Panoramio images for selected world regions, Dennis Zielstra et al., Journal of Spatial Science, 2013, pp. 251-273 (Year: 2013).*

International Search Report dated May 22, 2018 in PCT/JP2018/012289 filed Mar. 27, 2018.

Extended European Search Report dated Apr. 8, 2020 in corresponding European Patent Application No. 18790277.0, 8 pages.

* cited by examiner

FIG. 2
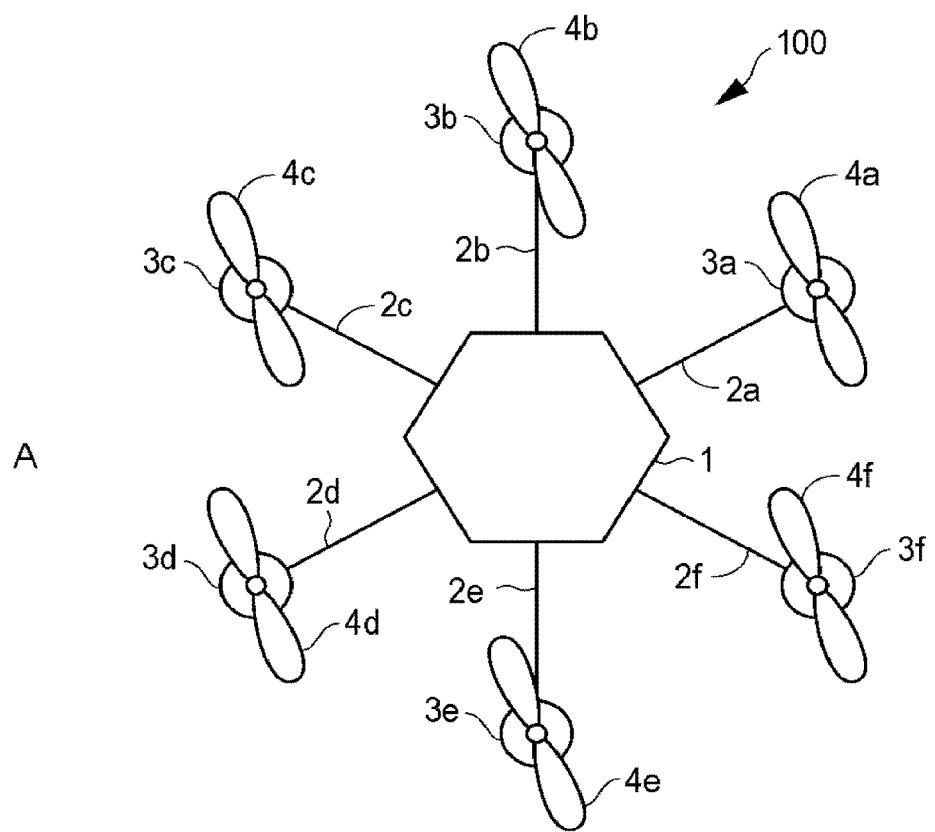
A
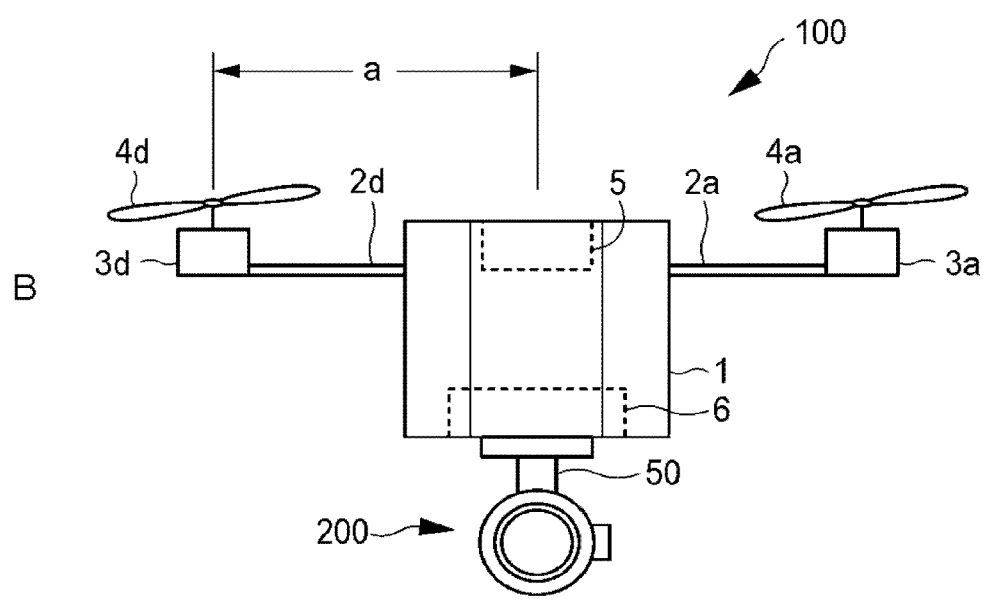
B

FIG. 17

ELEVATION DATABASE

| POSITION 0 | LATITUDE | LONGITUDE | ELEVATION |
|---|---|---|---|
| POSITION 1 | LATITUDE | LONGITUDE | ELEVATION |
| POSITION 2 | LATITUDE | LONGITUDE | ELEVATION |
| ⋮ | ⋮ | ⋮ | ⋮ |
| POSITION N | LATITUDE | LONGITUDE | ELEVATION |

FIG. 18
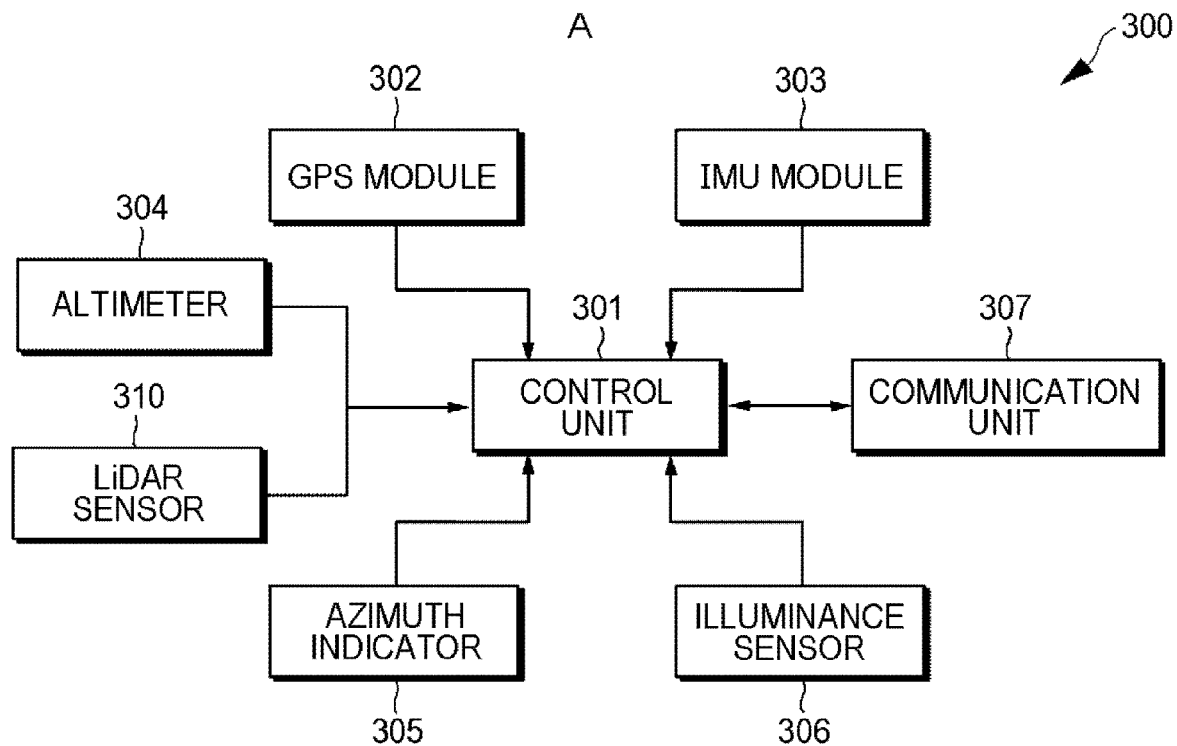
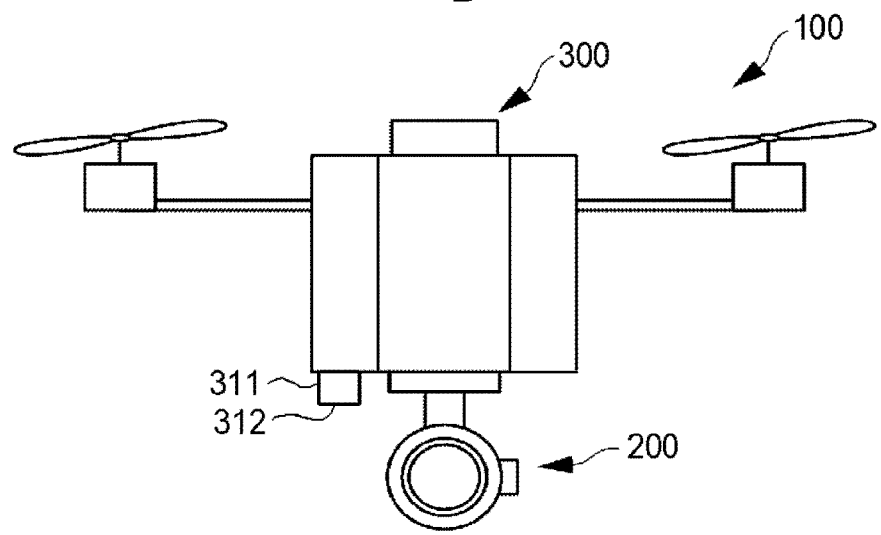

FIG. 23
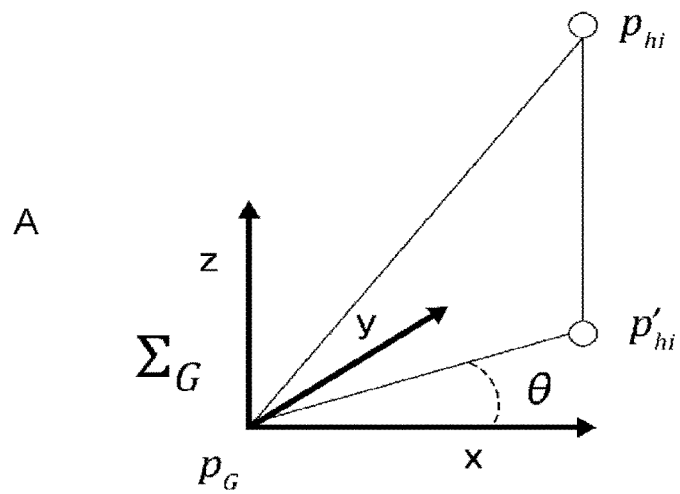
A
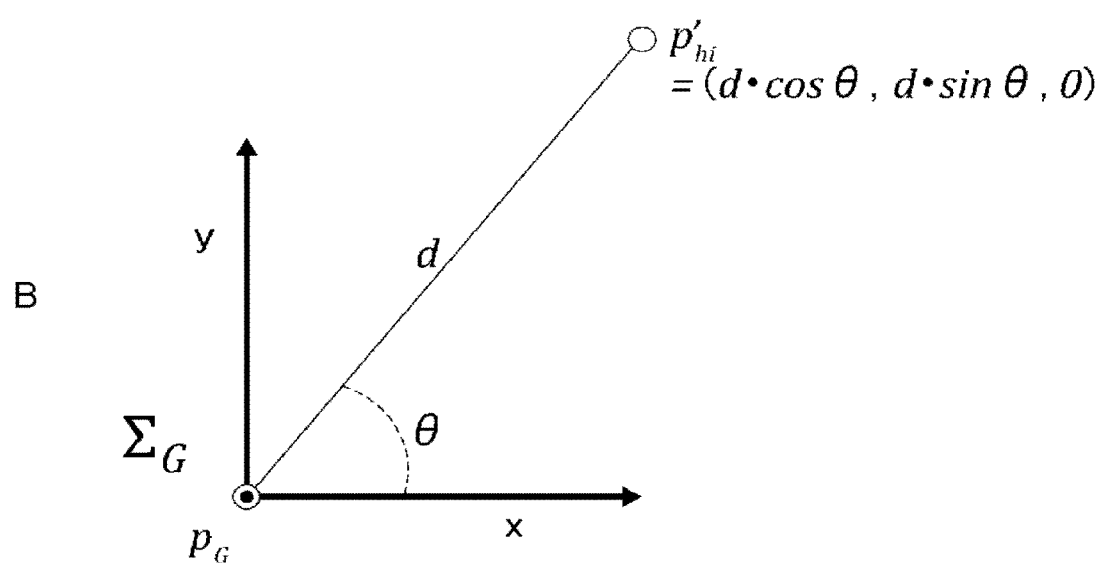
B

FIG. 24
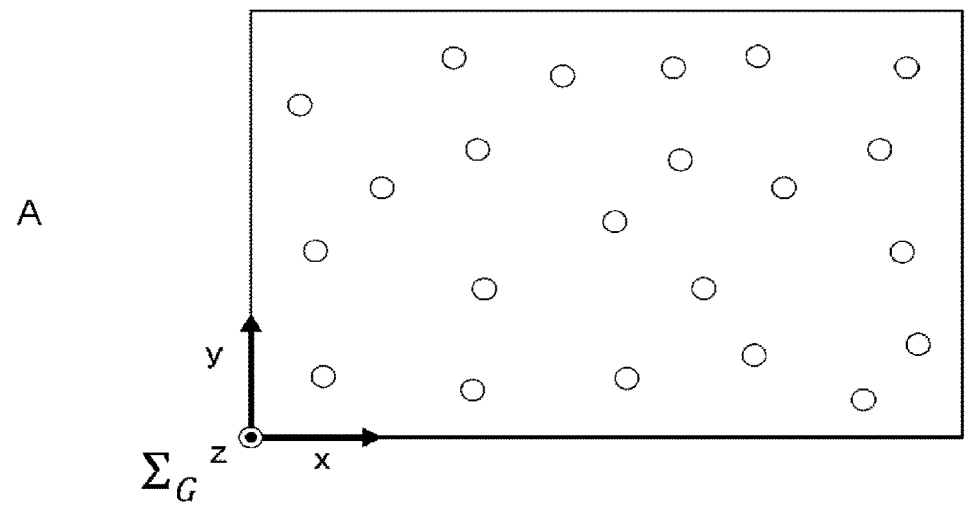
A
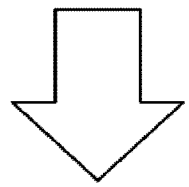
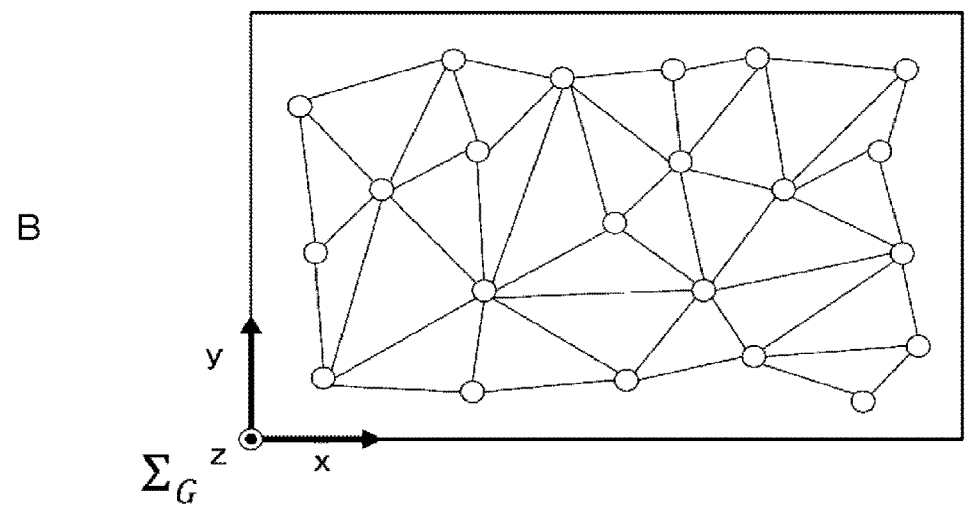
B

FIG. 27
A
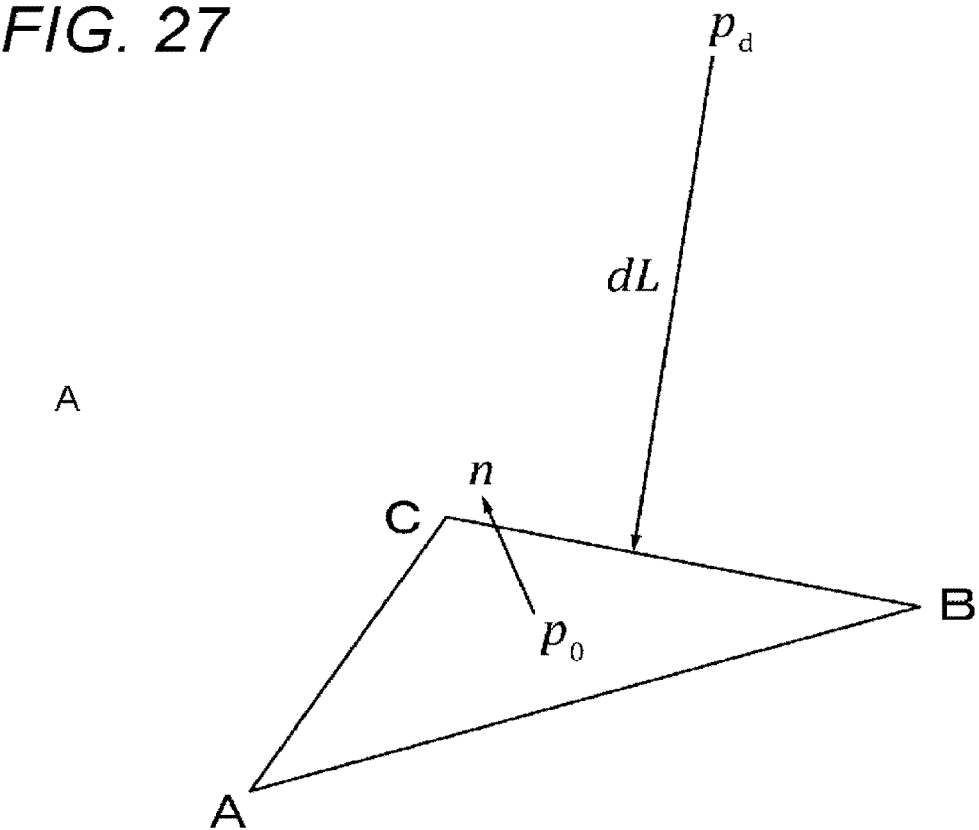
B
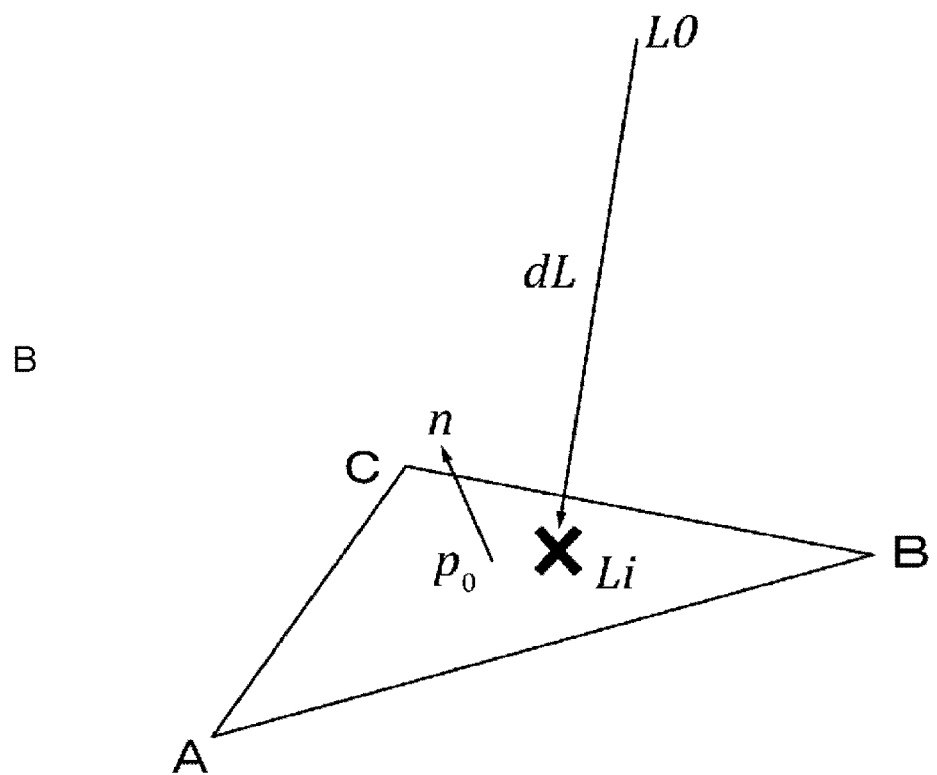

INFORMATION PROCESSING DEVICE, INFORMATION PROCESSING METHOD, INFORMATION PROCESSING PROGRAM, IMAGE PROCESSING DEVICE, AND IMAGE PROCESSING SYSTEM FOR ASSOCIATING POSITION INFORMATION WITH CAPTURED IMAGES

TECHNICAL FIELD

The present technology relates to an information processing device, an information processing method, an information processing program, an image processing device, and an image processing system.

BACKGROUND ART

In the related art, there is a method of imaging at fixed intervals with a camera mounted to a mobile object to obtain a composite image over a wide area by extracting feature points shared in common by overlapping portions of images that neighbor each other front to back or left to right, and joining the images together while cross-checking these feature points (Patent Document 1).

CITATION LIST

Patent Document

Patent Document 1: Japanese Patent Application Laid-Open No. H08-159762

SUMMARY OF THE INVENTION

Problems to be Solved by the Invention

In this method, enormous computational processing power is required to extract feature points from every single image and superimpose the images while cross-checking the feature points shared in common by the overlapping portions of adjacent images.

Also, to extract feature points consistently, more overlap between adjacent images is preferable, and because a larger number of images is required to form a composite image having a fixed area, the costs of data storage also rise. Additionally, there is another drawback regarding the movement route of the mobile object. Namely, to ensure more image overlap between adjacent paths, back-and-forth motions on a narrow interval are necessary, making it difficult to expand the area that can be imaged on a single flight given the constraints on battery capacity.

The present technology has been devised in light of problems like the above, and an object of the present technology is to provide an information processing device, an information processing method, an information processing program, an image processing device, and an image processing system capable of associating position information about a mobile object with images captured by an imaging device mounted to the mobile object for use in image processing.

Solutions to Problems

A first technology to achieve the above object relates to an information processing device configured to: acquire an image captured according to an imaging instruction by an imaging device mounted to a mobile object; acquire sensor information including position information about the mobile object from a sensor device according to a signal transmitted from the imaging device in response to the imaging instruction; and associate the acquired sensor information with the acquired image.

Further, a second technology relates to an information processing method including: acquiring an image captured according to an imaging instruction by an imaging device mounted to a mobile object; acquiring sensor information including position information about the mobile object from a sensor device according to a signal transmitted from the imaging device in response to the imaging instruction; and associating the acquired sensor information with the acquired image.

Further, a third technology relates to an information processing program causing a computer to execute an information processing method including: acquiring an image captured according to an imaging instruction by an imaging device mounted to a mobile object; acquiring sensor information including position information about the mobile object from a sensor device according to a signal transmitted from the imaging device in response to the imaging instruction; and associating the acquired sensor information with the acquired image.

Further, a fourth technology relates to an image processing device configured to receive a supply of a plurality of images associated with sensor information including position information about a mobile object acquired according to a signal transmitted from an imaging device in response to an imaging instruction, and create a composite image by arranging the plurality of the images on the basis of the sensor information.

Furthermore, a fifth technology relates to an image processing system including: a mobile object; an imaging device mounted to the mobile object; a sensor device mounted to the mobile object and configured to detect sensor information including position information about the mobile object according to a signal transmitted from the imaging device in response to an imaging instruction; and an information processing device configured to associate the sensor information with an image captured by the imaging device.

Effects of the Invention

According to the present technology, position information about a mobile object can be associated with images captured by an imaging device mounted to the mobile object for use in image processing. Note that, the effect described herein is not necessarily limited, and may also be any of the effects described in this specification.

BRIEF DESCRIPTION OF DRAWINGS

FIG. 2A is a plan view illustrating an exterior configuration of a mobile object, and FIG. 2B is a side view illustrating an exterior configuration of the mobile object.

FIG. 17 is a diagram illustrating a configuration of an elevation database.

FIG. 18A is a block diagram illustrating a configuration of a sensor device provided with a LiDAR sensor, and FIG. 18B is a side view illustrating an exterior configuration of a mobile object with a LiDAR sensor installed.

FIG. 23 is an explanatory diagram of converting latitude and longitude to the ground orthogonal coordinate system.

FIG. 24 is an explanatory diagram of a mesh structure.

FIG. 27 is a diagram explaining a method of computing a shadow position of a corner of an image.

MODE FOR CARRYING OUT THE INVENTION

Figure 1:
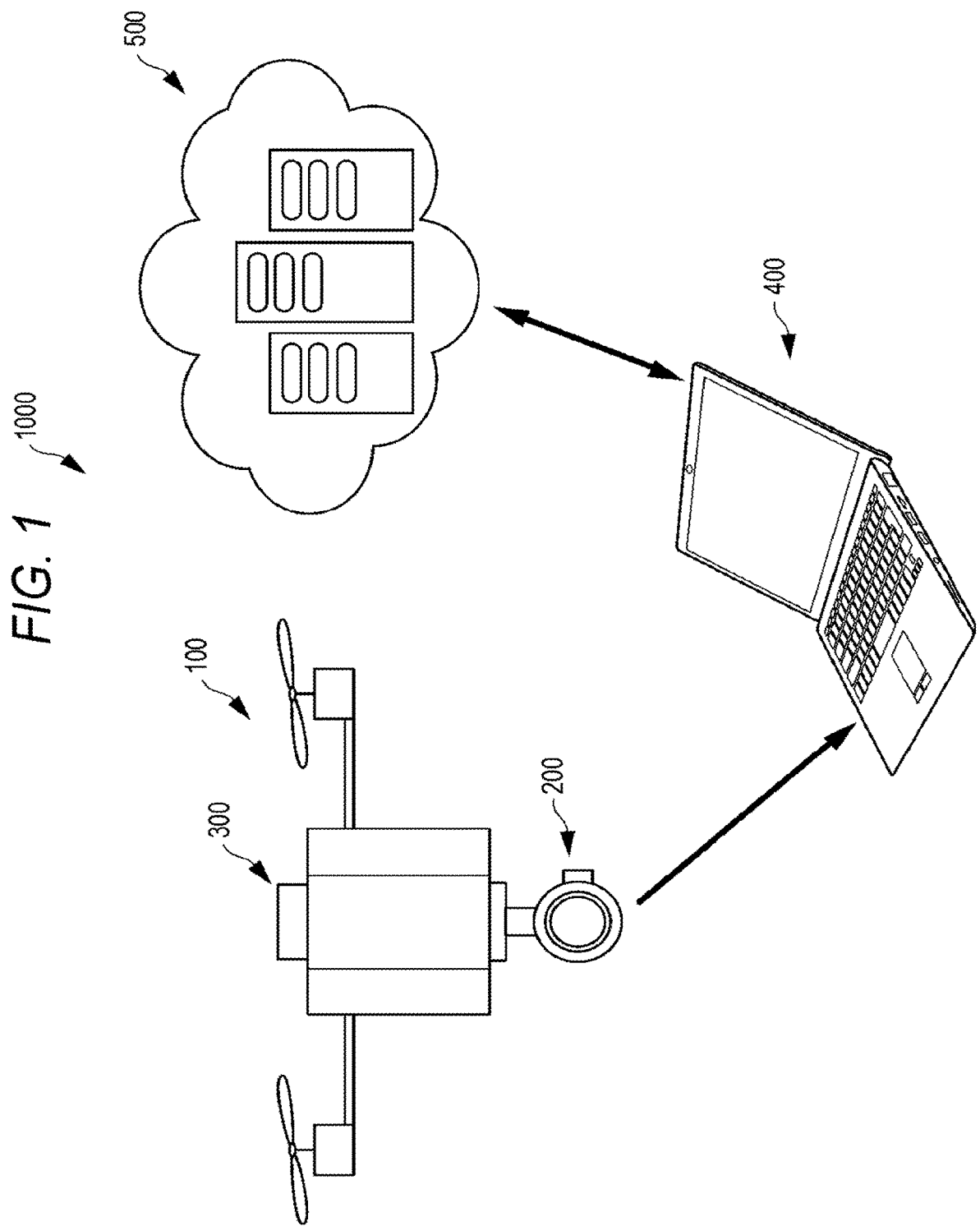
FIG. 1 is a diagram illustrating a configuration of an image processing system.

Hereinafter, embodiments of the present technology will be described while referring to the drawings. Hereinafter, the description will proceed in the following order.
<1. First embodiment>
[1-1. Configuration of image processing system]
[1-2. Configuration of mobile object]
[1-3. Configuration of imaging device]
[1-4. Configuration of sensor device]
[1-5. Configuration of terminal device and cloud]
[1-6. Process performed by image processing system]
[1-7. Imaging and sensor information association process]
[1-8. Composite image creation process]
<2. Second embodiment>
[2-1. Overview of composite image creation according to second embodiment]
[2-2. Overall process according to second embodiment]
[2-3. Composite image creation process]
<3. Modifications>

1. Embodiment

[1-1. Configuration of Image Processing System]

First, FIG. 1 will be referenced to describe a configuration of an image processing system 1000. The image processing system 1000 includes a mobile object 100, an imaging device 200, a sensor device 300, a terminal device 400, and a cloud 500.

In the present embodiment, the mobile object 100 is a small electric flight vehicle (unmanned aerial vehicle) referred to as a drone. The imaging device 200 is mounted to the mobile object 100, and captures images of a ground surface while the mobile object 100 is in flight. The sensor device 300 is provided with various sensors, is mounted to the mobile object 100, and supplies sensor information acquired by the various sensors to the imaging device 200. Note that the "imaging of the ground surface" is assumed to include not only the surface of the Earth and the ground itself but also artificial objects, such as buildings built on top of the ground and roads laid out on the ground surface, and natural objects.

The terminal device 400 is a computer or the like used by a user or the like who uses the image processing system 1000 on the ground, and performs a composite image creation process using images captured by the imaging device 200.

The cloud is configured by a server of a cloud service provider company or the like, and performs the composite image creation process using the images captured by the imaging device 200.

The composite image creation process uses a plurality of images captured by the imaging device 200 mounted to the mobile object 100 while the mobile object 100 is moving to create a single large composite image by arranging the images such that adjacent images partially overlap. Consequently, the images captured by the imaging device 200 are supplied to the terminal device 400 and/or the cloud 500.

Note that in a case where the terminal device 400 performs the composite image creation process, the composite image creation process does not have to be performed by the cloud 500, whereas in a case where the composite image creation process is performed by the cloud 500, the composite image creation process does not have to be performed by the terminal device 400. In addition, the composite image creation process may also be performed by both the terminal device 400 and the cloud 500. The cloud 500 may also not perform the composite image creation process, and instead save a composite image created by the terminal device 400 and supply the composite image in response to a request from the user.

In the present embodiment, an imaging plan is determined in advance. The imaging plan indicates a flight plan (altitude, speed, path) of the mobile object 100 and an imaging plan indicating where (imaging position) and over which range (imaging range) to perform imaging at fixed intervals, in consideration of the combination of property specifications (horizontal/vertical lens angle of view) and operating settings (shutter cycle) of the imaging device 200. The mobile object 100 flies in accordance with the flight plan, and the imaging device 200 performs imaging in accordance with the imaging plan.

[1-2. Configuration of Mobile Object]

Figure 3:
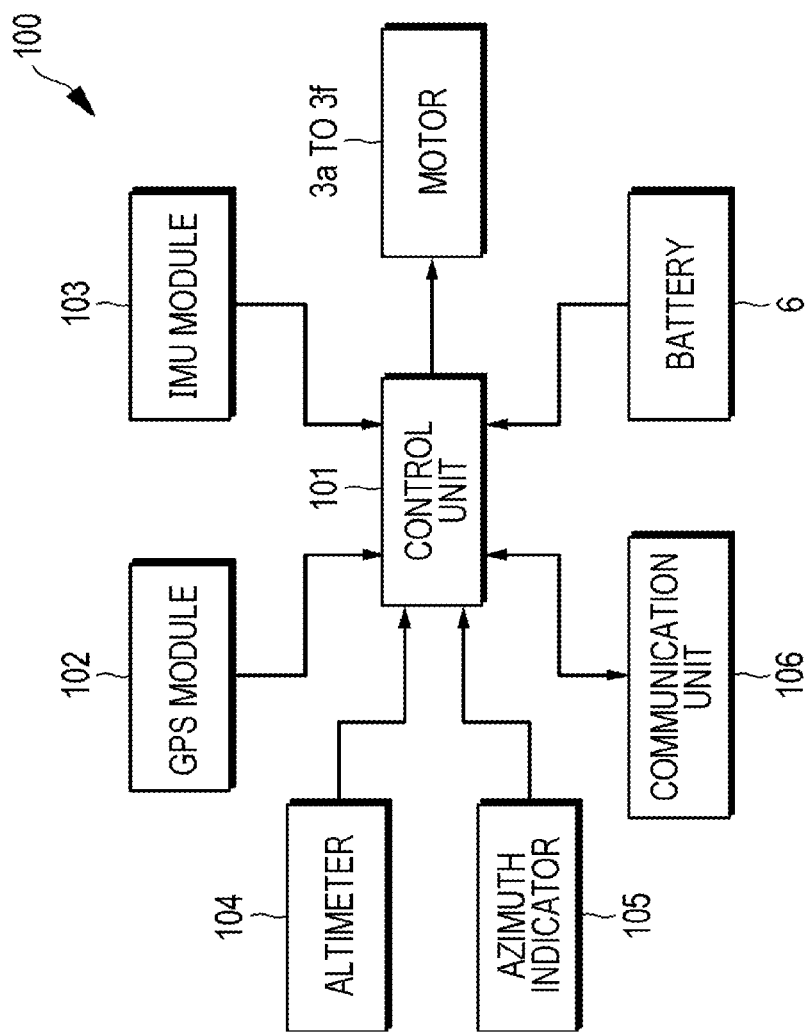
FIG. 3 is a block diagram illustrating a configuration of the mobile object.

FIGS. 2 and 3 will be referenced to describe a configuration of the mobile object 100. FIG. 2A is a plan view of the mobile object 100, and FIG. 2B is a front view of the mobile object 100. An airframe includes a circular cylindrical or polygonal cylindrical fuselage 1 as a central part, and support shafts 2a to 2f affixed to the upper part of the fuselage 1. As one example, the fuselage 1 is shaped like a hexagonal cylinder, and six support shafts 2a to 2f extend radially outward from the center of the fuselage 1 at equi-angular intervals. The fuselage 1 and the support shafts 2a to 2f include a lightweight, high-strength material.

Additionally, the shapes, arrangement, and the like of each component part of the airframe including the fuselage 1 and the support shafts 2a to 2f are designed such that the center of gravity lies on a vertical line passing through the center of the support shafts 2a to 2f. Furthermore, a circuit unit 5 and a battery 6 are provided inside the fuselage 1 such that the center of gravity lies on the vertical line.

In the example of FIG. 2, there are six rotors and motors. However, a configuration having four rotors and motors or a configuration having eight or more rotors and motors is also acceptable.

Motors 3a to 3f that act as the driving sources of the rotors are installed on the front ends of the support shafts 2a to 2f, respectively. Rotors 4a to 4f are installed on the revolving shafts of the motors 3a to 3f. The circuit unit 5 that includes a control unit for controlling each motor is installed in the central part where the support shafts 2a to 2f converge.

The motor 3a and the rotor 4a form a pair with the motor 3d and the rotor 4d. Similarly, (motor 3b, rotor 4b) and (motor 3e, rotor 4e) form a pair, and (motor 3c, rotor 4c) and (motor 3f, rotor 4f) form a pair.

The battery 6 that acts as a power source is disposed on the bottom inside the fuselage 1. The battery 6 includes a lithium-ion secondary cell and a battery control circuit that controls charging and discharging, for example. The battery 6 is removably installed inside the fuselage 1. By aligning the center of gravity of the battery 6 with the center of gravity of the airframe, the stability of the center of gravity is increased.

A small electric flight vehicle typically referred to as a drone enables desired flight by controlling the outputs of the motors. For example, in a hovering state of staying still in midair, a gyro sensor mounted to the airframe is used to detect inclination, and the airframe is kept horizontal by increasing the motor output on a lowered side of the airframe and reducing the motor output on a raised side. Furthermore, when advancing forward, by reducing the motor output in the direction of travel and increasing the motor output in the opposite direction, the airframe is made to take a forward-leaning attitude and produce thrust in the direction of travel. In such attitude control and propulsion control of a small electric flight vehicle, the installation position of the battery 6 as described above strikes a balance between the stability of the airframe and the ease of control.

FIG. 3 is a block diagram illustrating a configuration of the mobile object 100. The mobile object 100 is provided with a control unit 101, a Global Positioning System (GPS) module 102, an inertial measurement unit (IMU) module 103, an altimeter 104, an azimuth indicator 105, a communication unit 106, the battery 6, and the motors 3a to 3f. Note that the support shafts, rotors, and the like described in the exterior configuration of the mobile object 100 above are omitted. The control unit 101, the GPS module 102, the IMU module 103, the altimeter 104, the azimuth indicator 105, and the communication unit 106 are assumed to be included in the circuit unit 5 illustrated in the exterior view of the mobile object 100 in FIG. 1.

The control unit 101 includes a central processing unit (CPU), random access memory (RAM), read-only memory (ROM), and the like. In the ROM, programs loaded and run by the CPU and the like are stored. The RAM is used as a work memory for the CPU. The CPU, by executing various processes and issuing commands in accordance with a program stored in the ROM, controls the mobile object 100 as a whole, sets the timings of imaging by the imaging device 200, transmits an imaging instruction signal to the imaging device 200, and the like.

Also, the control unit 101 controls the flight of the mobile object 100 by controlling the outputs of the motors 3a to 3f.

The GPS module 102 acquires the current position (latitude and longitude information) of the mobile object 100 and the current time, and supplies the acquired information to the control unit 101.

The IMU module 103 is an inertial measurement device, and by computing the angular velocity and acceleration in three dimensions with acceleration sensors, angular velocity sensors, gyro sensors, and the like for two or three axis directions, the IMU module 103 detects attitude information about the attitude and inclination of the mobile object 100, the angular velocity when turning, and the angular velocity about the Y-axis direction, and supplies the detected attitude information to the control unit 101.

The altimeter 104 measures the altitude at which the mobile object 100 is positioned and supplies altitude data to the control unit 101. The altimeter 104 is a barometric altimeter, a radio altimeter, or the like. A barometric altimeter detects the pressure of the atmosphere, while a radio altimeter emits a radio wave toward the ground surface directly below, measures a reflected wave from the ground surface, and computes the altitude from the time between the radio wave emission and the reflected wave arrival.

The azimuth indicator 105 uses the action of a magnet to detect the travel bearing of the mobile object 100 and supplies the travel bearing to the control unit 101.

The communication unit 106 is various communication terminals or a communication module for transmitting and receiving data with the imaging device 200. An imaging instruction signal that triggers imaging is transmitted from the mobile object 100 to the imaging device 200. Communication with the terminal device 400 may be wired communication such as Universal Serial Bus (USB) communication or wireless communication such as wireless local area network (LAN) like Wi-Fi, Bluetooth (registered trademark), or ZigBee. In addition, the communication unit 106 also communicates with external equipment (such as a personal computer, a tablet terminal, or a smartphone) that functions as equipment for controlling the mobile object 100 from the ground (referred to as a base station). The mobile object 100 transmits the status of the mobile object 100 in flight to the base station through communication by the communication unit 106. Also, instructions and the like from the base station are received. Because the mobile object 100 is a flight vehicle that flies in midair, the communication with the base station is performed by wireless communication.

In the present embodiment, the imaging device 200 is mounted to the lower side of the mobile object 100 while the sensor device 300 is mounted to the upper side of the mobile object 100. Note that the sensor device 300 is not limited to being mounted to the upper side of the mobile object 100, but is preferably mounted to the upper side of the mobile object 100 for easy acquisition of information such as GPS.

[1-3. Configuration of Imaging Device]

As illustrated in FIG. 2B, the imaging device 200 is mounted hanging down from the bottom of the fuselage 1 of the mobile object 100 through a camera mount 50 that functions as a gimbal. By the driving of the camera mount 50, the imaging device 200 is capable of pointing a lens and imaging in any direction from 360 degrees in the horizontal direction to the vertical direction. Note that the operations of the camera mount 50 are controlled by the control unit 101 on the basis of the imaging plan.

Figure 4:
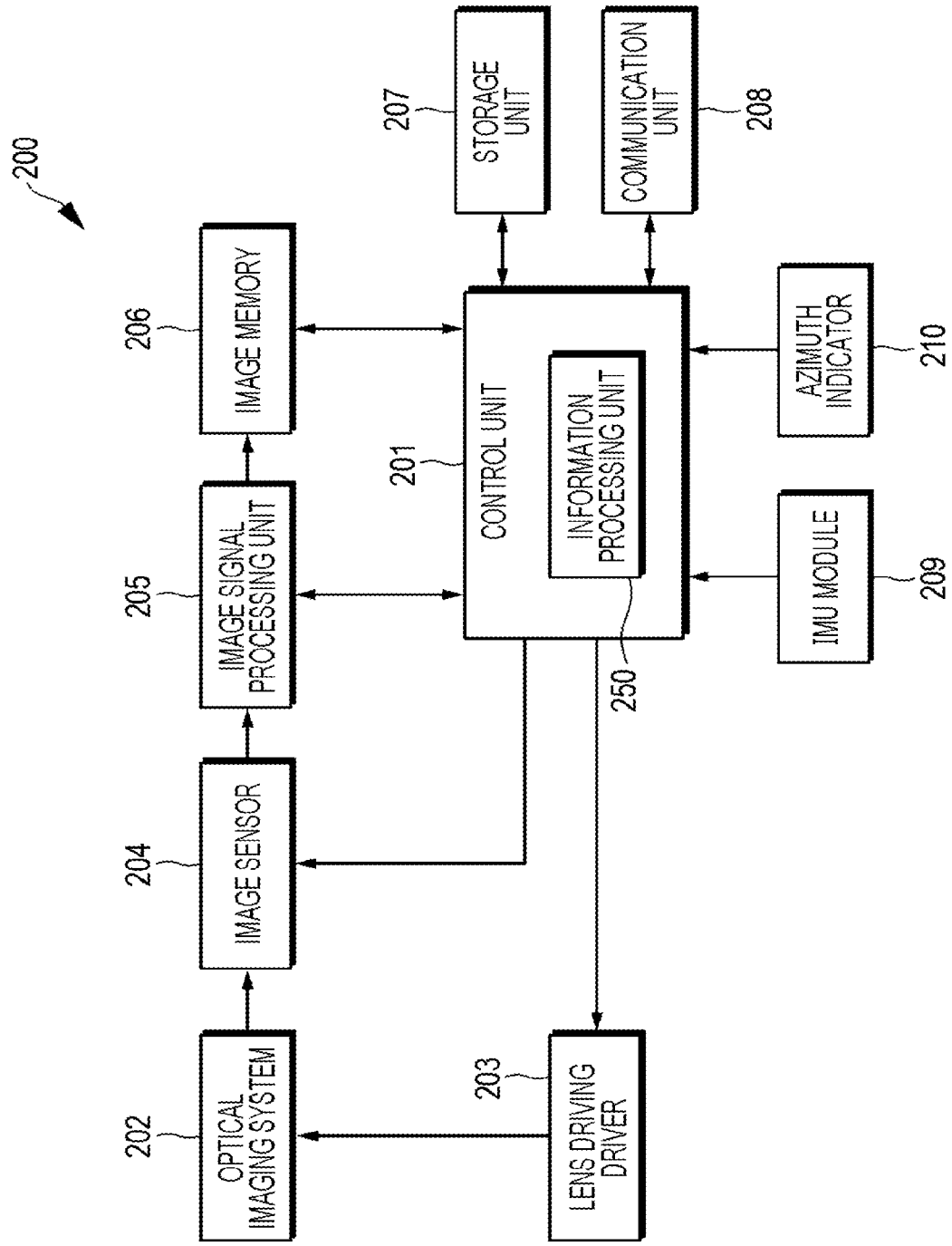
FIG. 4 is a block diagram illustrating a configuration of an imaging device.

The block diagram in FIG. 4 will be referenced to describe a configuration of the imaging device 200. The imaging device 200 is provided with a control unit 201, an optical imaging system 202, a lens driving driver 203, an image sensor 204, an image signal processing unit 205, image memory 206, a storage unit 207, a communication unit 208, an IMU module 209, an azimuth indicator 210, and an information processing unit 250.

The control unit 201 includes a CPU, RAM, ROM, and the like. The CPU controls the imaging device 200 as a whole by executing various processes and issuing commands in accordance with a program stored in the ROM.

Additionally, the control unit 201 also functions as the information processing unit 250. The information processing unit 250 performs a process of saving, in the storage unit 207, images obtained by imaging in association with sensor information transmitted from the sensor device 300 as metadata. Details of the process by the information processing unit 250 will be described later.

Note that the information processing unit 250 includes a program, and the program may be preinstalled in the imaging device 200, or the program may be downloaded, distributed on a storage medium, or the like and installed by the user oneself. Additionally, the information processing unit 250 may also be a configuration independent from the control unit 201. Furthermore, the information processing unit 250 may not only be realized by a program, but may also be realized in combination with a dedicated device, circuit, or the like through hardware having the functionality of the information processing unit 250.

The optical imaging system 202 includes an imaging lens for condensing light from a subject onto the image sensor 204, a driving mechanism for moving the imaging lens to perform focusing and zooming, a shutter mechanism, an iris mechanism, and the like. These are driven on the basis of control signals from the control unit 201 and the lens driving driver 203 of the imaging device 200. An optical image of the subject obtained through the optical imaging system 202 is formed on the image sensor 204 provided in the imaging device 200.

The lens driving driver 203 includes a microcontroller or the like for example, and performs autofocusing to bring a target subject into focus by moving the imaging lens by a predetermined amount in the optical axis direction in accordance with control by the control unit 201. Also, operations such as the driving mechanism, the shutter mechanism, and the iris mechanism of the optical imaging system 202 are controlled in accordance with control from the control unit 201. With this arrangement, adjustment of the exposure time (shutter speed) and adjustment of the aperture value (f-number) and the like are performed.

The image sensor 204 photoelectrically converts incident light from the subject into an electric charge, and outputs a pixel signal. Subsequently, the image sensor 204 outputs the pixel signal to the image signal processing unit 205. A charge coupled device (CCD) sensor, a complementary metal oxide semiconductor (CMOS) sensor, or the like is used as the image sensor 204.

The image signal processing unit 205 subjects the imaging signal output from the image sensor 204 to a sample-and-hold process for maintaining a favorable signal/noise (S/N) ratio by a correlated double sampling (CDS) process, an auto gain control (AGC) process, analog/digital (A/D) conversion, and the like, and creates an image signal.

In addition, the image signal processing unit 205 may also subject the image signal to predetermined signal processing such as a demosaicing process, a white balance adjustment process or color correction process, a gamma correction process, a Y/C conversion process, an auto exposure (AE) process, and a resolution conversion process.

The image memory 206 is buffer memory including volatile memory, dynamic random access memory (DRAM) for example. The image memory 206 temporarily buffers image data subjected to the predetermined processing by the image signal processing unit 205.

The storage unit 207 is a mass storage medium such as a hard disk, USE flash memory, or an SD memory card, for example. A captured image is saved in a compressed or uncompressed state on the basis of a standard such as the Joint Photographic Experts Group (JPEG) for example. Also, exchangeable image file format (EXIF) data containing additional information such as information related to the saved image, imaging position information indicating the imaging position, and imaging time information indicating the imaging date and time is also saved in associated with the image. Also, IMU data obtained by the IMU module 209 is associated with the image as extensible metadata platform (XMP). The image is saved in the storage unit 207 by the information processing unit 250 in a state with the sensor information associated as metadata.

The communication unit 208 is various communication terminals or a communication module for transmitting and receiving data with the mobile object 100 and the sensor device 300. In the communication with the mobile object 100, an imaging instruction signal from the mobile object 100 is received. In the communication with the sensor device 300, an exposure notification signal that notifies the sensor device 300 of a predetermined timing from the beginning to the end of exposure is transmitted, while in addition, sensor information transmitted from the sensor device 300 is received. Communication between the mobile object 100 and the sensor device 300 may be wired communication such as USB communication or wireless communication such as wireless LAN like Wi-Fi, Bluetooth (registered trademark), or ZigBee. Note that in the case of performing the communication between the imaging device 200 and the mobile object 100 by USB communication, the imaging device 200 is capable of receiving a supply of power from the battery 6 of the mobile object 100.

The IMU module 209 and the azimuth indicator 210 are similar to the ones provided in the mobile object 100. The IMU module 209 detects the attitude and inclination of the imaging device 200, and the azimuth indicator 210 detects the imaging bearing of the imaging device 200.

[1-4. Configuration of Sensor Device]

Figure 5:
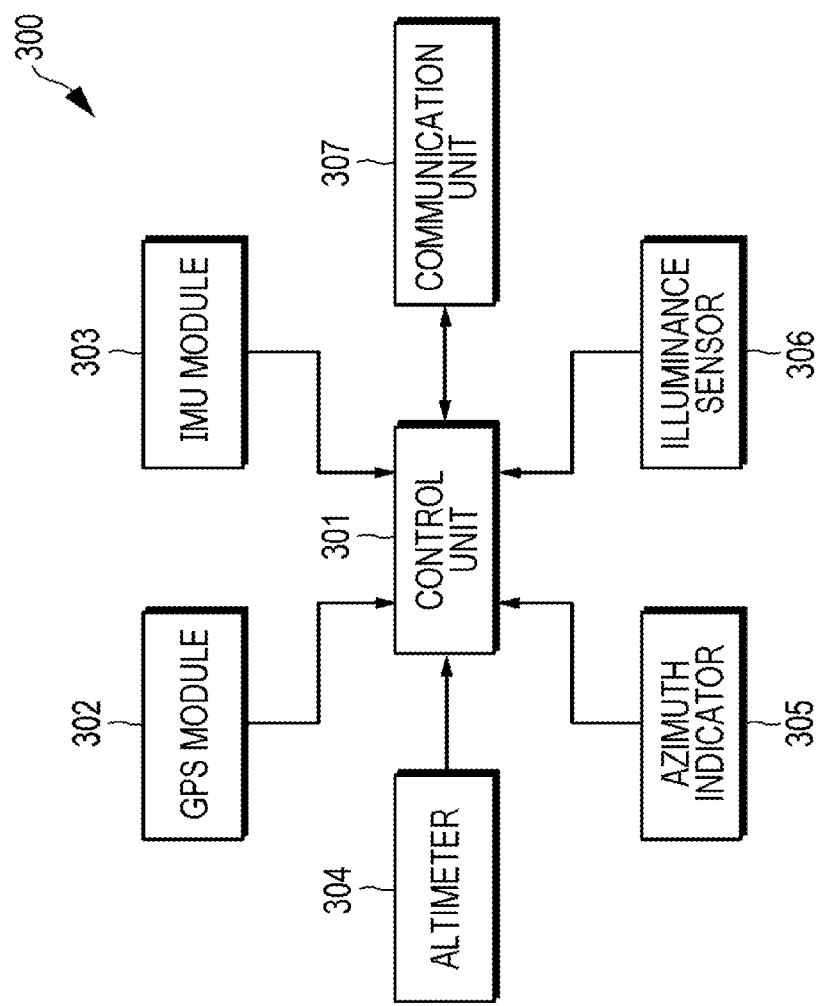
FIG. 5 is a block diagram illustrating a configuration of a sensor device.

The block diagram in FIG. 5 will be referenced to describe a configuration of the sensor device 300. The sensor device 300 is provided with a control unit 301, a GPS module 302, an IMU module 303, an altimeter 304, an azimuth indicator 305, an illuminance sensor 306, and a communication unit 307.

The control unit 301 includes a CPU, RAM, ROM, and the like. The CPU controls the sensor device 300 as a whole by executing various processes and issuing commands in accordance with a program stored in the ROM.

The GPS module 302, the IMU module 303, the altimeter 304, and the azimuth indicator 305 are similar to the one provided in the mobile object 100. In this way, the sensor device 300 is provided with a plurality of sensors, and supplies sensor information obtained by these sensors to the imaging device 200.

The GPS module 302 is for detecting the horizontal position coordinates of the mobile object 100 while the mobile object 100 is in flight. The IMU module 303 is for detecting the inclination of the mobile object 100 while the mobile object 100 is in flight. The altimeter 304 is for detecting the altitude of the mobile object 100 while the mobile object 100 is in flight. The azimuth indicator 305 is for detecting the travel bearing of the mobile object 100 while the mobile object 100 is in flight. Note that the mobile object 100 is also provided with the GPS module 102, the IMU module 103, the altimeter 104, and the azimuth indicator 105, but the ones provided in the mobile object 100 are for the flight of the mobile object 100 itself, whereas the one provided in the sensor device 300 are for acquiring the sensor information to be associated with images.

The illuminance sensor 306 is provided with a photodetector, detects brightness by converting light incident on the photodetector into a current, and supplies the detected brightness to the sensor control unit 301. Since the imaging environment and the brightness of the image change depending on the imaging time, weather, and the like, the brightness is detected by the illuminance sensor 306. Also, by giving the illuminance sensor 306 sensitivity characteristics divided into a plurality of wavelength bands, it is also possible to specify an energy ratio in a spectral distribution or a plurality of specific wavelength bends in sunlight shining down on the mobile object 100 and the ground at the point in time when an image is captured.

The communication unit 307 is various communication terminals or a communication module for transmitting and receiving data with the imaging device 200. The communication unit 307 receives an exposure notification signal from the imaging device 200, while in addition, transmits sensor information obtained by the sensor device 300 to the imaging device 200. Communication with the imaging device 200 may be wired communication such as USB communication or wireless communication such as wireless LAN like Wi-Fi, Bluetooth (registered trademark), or ZigBee. Note that in the case of performing the communication between the sensor device 300 and the imaging device 200 by USB communication, the sensor device 300 is capable of receiving a supply of power from the battery 6 of the mobile object 100 through the imaging device 200.

The mobile object 100, the imaging device 200, and the sensor device 300 are configured as above. The drone, that is, the mobile object 100 having the mounted imaging device 200, can not only be operated manually by an operator, but is also capable of automatic flight and automatic imaging utilizing GPS data and IMU data. In the case of performing automatic flight and automatic imaging, path information about the flight route and imaging information such as the imaging position, the imaging direction, and the imaging time are preset, and the control unit 110 of the mobile object 100 controls the flight of the mobile object 100 and instructs the imaging device 200 to perform imaging in accordance with the set content. In addition, the path information and the imaging information may also be acquired by wireless communication from the base station.

[1-5. Configuration of Terminal Device and Cloud]

The terminal device 400 is a personal computer or the like, and performs the composite image creation process using the images captured by the imaging device 200 and the sensor information. The images captured by the imaging device 200 and the sensor information are transferred from the storage unit 207 of the imaging device 200 to the terminal device 400 via a portable storage medium such as USB flash memory or an SD memory card. Note that the imaging device 200 may also be configured to save the images and the sensor information directly to the portable storage medium without going through the storage unit 207. Additionally, images may be transferred by communication between the communication unit 208 of the imaging device 200 and the terminal device 400. The terminal device 400 may be a laptop PC or a desktop PC, and may also be a tablet terminal, a smartphone, a game console, or the like insofar as the device is provided with sufficient processing power and is capable of executing the composite image creation process. The device or processing unit that performs the composite image creation process, such as the terminal device 400, corresponds to the "image processing device" in the claims.

The cloud 500 also performs the composite image creation process using the images captured by the imaging device 200 and the sensor information. The cloud refers to one mode of utilization of a computer, and is constructed on a server of the cloud service provider company. The cloud service refers to a service provided by a server existing on a network, and is one mode of utilization of a computer based on the Internet. Required processes are basically all performed on the server side. The user saves data on the server over the Internet rather than on one's own PC, smartphone, mobile phone, or the like. Therefore, the user can use the service and view, edit, or upload data and the like also in a variety of environments, such as at home, at a company, in an Internet café, at school, or a place where one has gone. The composite image creation process according to an embodiment of the present technology may be executed by the cloud 500 and provided to a consumer as a cloud service.

Images and sensor information are transmitted from the terminal device 400 to the cloud 500 through the Internet. Additionally, in a case where the imaging device 200 is provided with an Internet connectivity function, images and sensor information may also be transmitted from the imaging device 200 to the cloud 500 through the Internet. A composite image created by the cloud 500 may be saved in the cloud 500 only, or may also be transferred to the terminal device 400 and/or the imaging device 200.

[1-6. Process Performed by Image Processing System]

Figure 6:
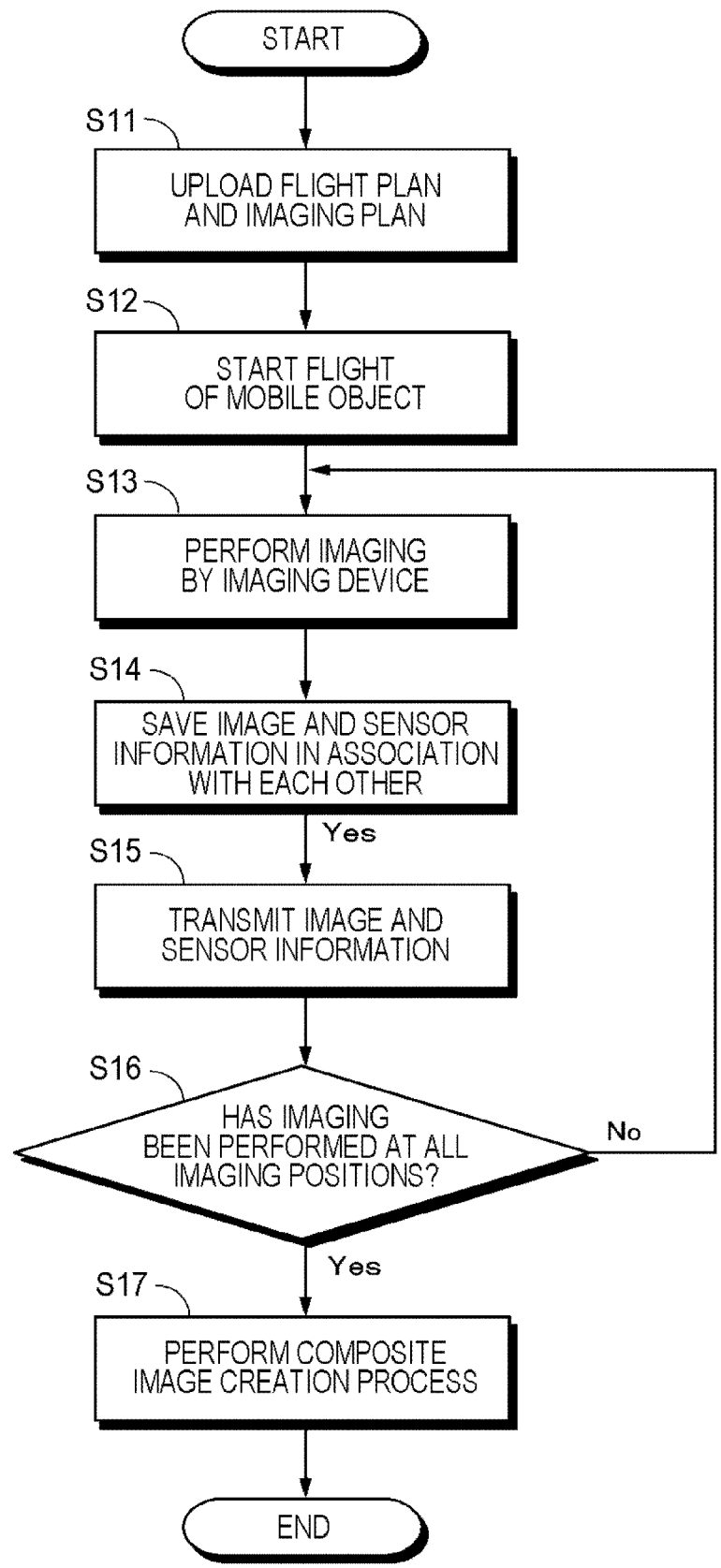
FIG. 6 is a flowchart illustrating the flow of a process performed by the image processing system.

Next, the flowchart in FIG. 6 will be referenced to describe an overview of a process performed by the image processing system 1000. First, in step S11, a preprogrammed flight plan is uploaded to the control unit 101 of the mobile object 100, while in addition, a preprogrammed imaging plan is uploaded to the control unit 201 of the imaging device 200. The uploading is performed by for example operation input by the user, automatic transfer from the base station, or the like. Next, in step S12, the flight of the mobile object 100 is started. Next, in step S13, imaging is performed by the imaging device 200 while the mobile object 100 is in flight. Also, sensor information is acquired by the sensor device 300 in parallel with the imaging by the imaging device 200. Next, in step S14, captured images are saved in the storage unit 207 of the imaging device 200 in association with the sensor information.

Next, the process proceeds to step S15, and the images as well as the sensor information associated as metadata are transmitted from the storage unit 207 of the imaging device 200 to the terminal device 400 and/or the cloud 500. Next, in step S16, the terminal device 400 determines whether or not imaging has been performed at all imaging positions in the imaging plan, and steps S13 to S16 are repeated until imaging is performed at all imaging positions (step S15, No). Subsequently, in step S17, the composite image creation process is performed by the terminal device 400 and/or the cloud 500. Details of each process will be described later.

[1-7. Imaging and Sensor Information Association Process]

Figure 7:
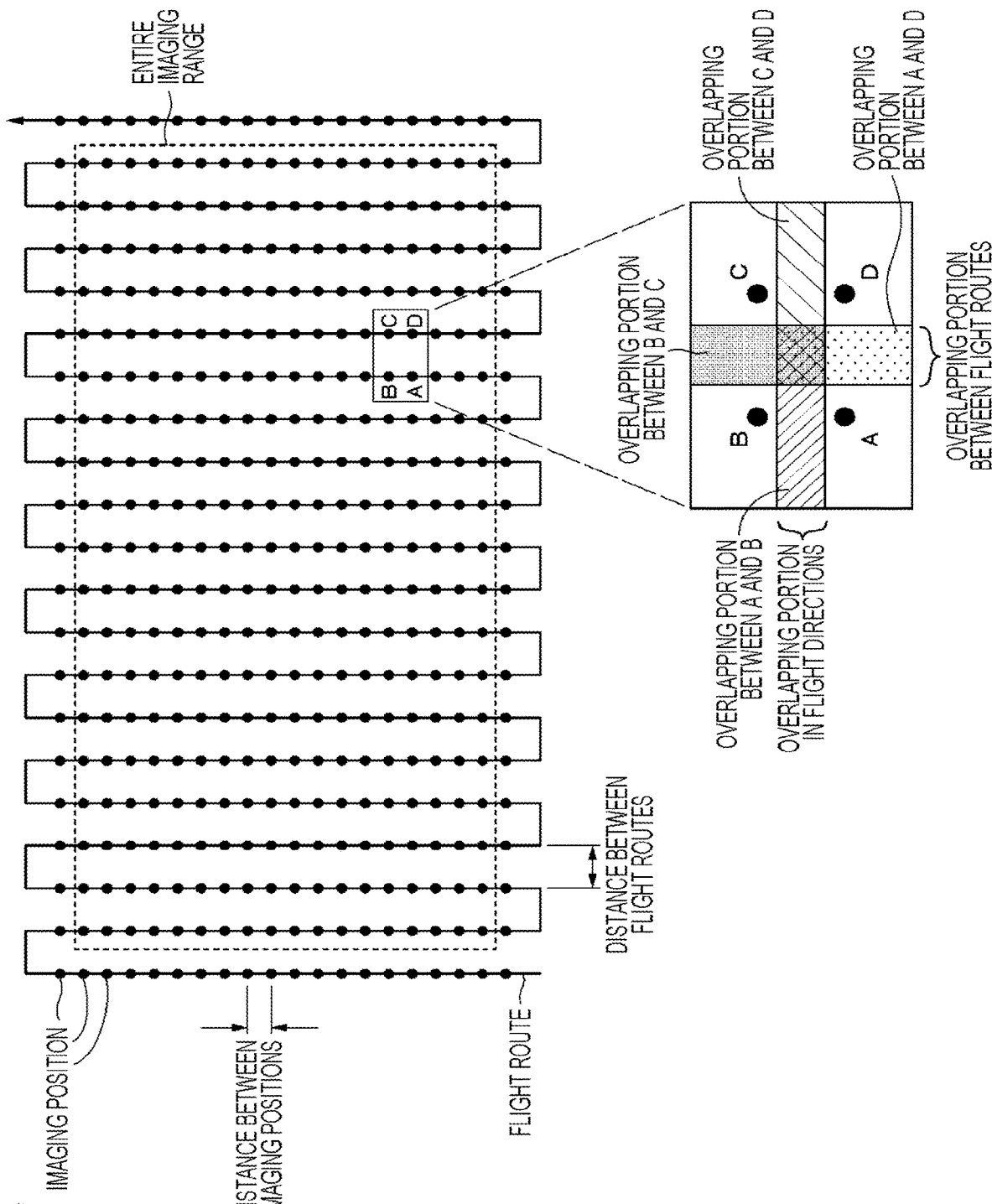
FIG. 7 is a diagram for explaining a flight plan and an imaging plan.

Next, FIGS. 7 to 10 will be referenced to describe the imaging and sensor information association process according to the present embodiment. FIG. 7 is a diagram for explaining a flight route of the mobile object 100 and imaging positions.

The dashed line in FIG. 7 indicates the entire imaging range of a ground surface to be imaged by the imaging device 200 that is set in the imaging plan. The composite image that is ultimately created by the composite image creation process becomes an image containing the entire imaging range.

The solid line in FIG. 7 indicates the flight route of the mobile object 100 set such that the entire imaging range is imaged, and the plurality of points on the solid line indicates the imaging positions where imaging is performed by the imaging device 200. Because the mobile object 100 includes the GPS module 102 and the IMU module 103 for obtaining its own position and attitude, after take-off, the mobile object 100 flies on the flight route following the flight plan and performs imaging at each imaging position by transmitting an imaging instruction signal to the imaging device 200 on the basis of the imaging plan.

Note that the method of imaging at fixed intervals may be a method of repeating imaging automatically at fixed distance intervals on the basis of GPS data or a method of repeating imaging automatically at fixed time intervals, but the method is not limited to either one. In the case of imaging at fixed distance intervals, an imaging instruction is transmitted from the mobile object 100 to the imaging device 200. This is because the positions of the mobile object 100 and the imaging device 200 are acquired by the GPS module 102 provided in the mobile object 100, and the imaging instruction is issued on the basis of GPS data indicating the position. On the other hand, in the case of imaging at fixed time intervals, the imaging instruction can be issued by one of the mobile object 100 or the imaging device 200 provided with a timekeeping function.

As illustrated in the enlarged view of the extracted portion of the imaging positions A, B, C, and D in FIG. 7, the flight plan and the imaging plan are set such that overlapping portions of the imaging range occur in the direction of travel of the mobile object 100 as well as in the direction between flight routes. By performing imaging such that overlapping portions occur in the imaging range in this way, gaps and missing parts are prevented from occurring in the case of creating a composite image with the plurality of images acquired by imaging.

Note that the flight plan and the imaging plan illustrated in FIG. 7 have been set for the sake of convenience in the explanation of the present technology, and the present technology is not limited to such a flight route and imaging positions.

Figure 8:
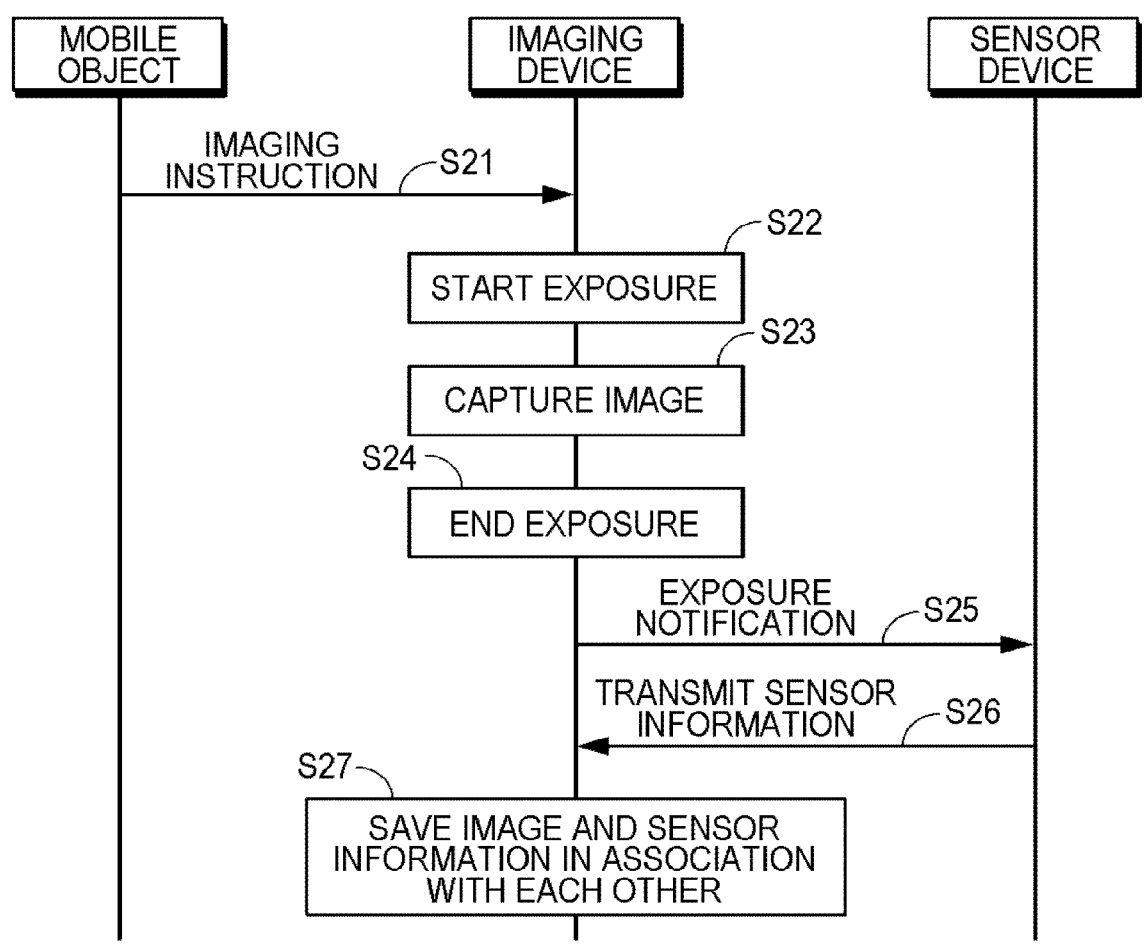
FIG. 8 is a sequence diagram of a process performed by the image processing system.

Next, the sequence diagram in FIG. 8 will be referenced to describe the flow of a process among the mobile object 100, the imaging device 200, and the sensor device 300. First, in step S21, an imaging instruction signal based on the imaging plan is transmitted from the mobile object 100 to the imaging device 200.

Next, in step S22, the imaging device 200 that has received the imaging instruction signal starts exposure, and after acquiring an image in step S23, ends exposure in step S24 after a predetermined exposure time elapses. Next, in step S25, at the point in time when the exposure time has elapsed and exposure has ended, an exposure notification signal indicating that exposure has ended is transmitted from the imaging device 200 to the sensor device 300.

Next, in step S26, sensor information is transmitted to the imaging device 200 from the sensor device 300 that has received the exposure notification signal from the imaging device 200. Additionally, in step S27, the imaging device 200 saves the image acquired by imaging, with the sensor information associated as metadata, in the storage unit 207.

The above process is performed for all images acquired by imaging.

Figure 9:
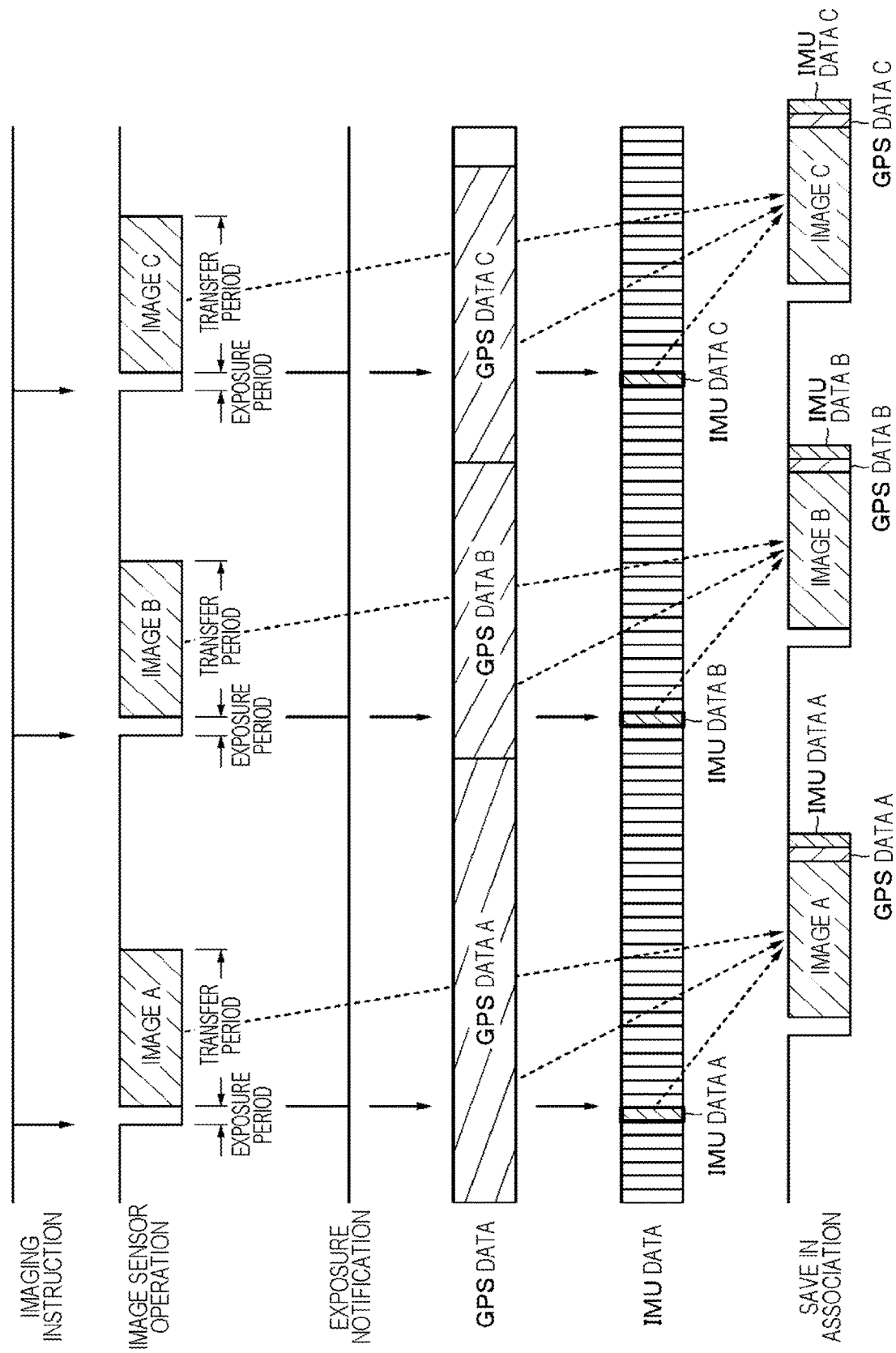
FIG. 9 is a diagram for explaining an association of images and sensor information.

Next, FIG. 9 will be referenced to describe the process of associating the sensor information acquired by the sensor device 300 as metadata with the images captured by the imaging device 200. All images captured on the basis of the flight plan and the imaging plan illustrated in FIG. 7 are saved in the storage unit 207 with the sensor information acquired by the sensor device 300 associated as metadata. Note that the following description referencing FIG. 9 assumes that the sensor information transmitted from the sensor device 300 to the imaging device 200 is GPS data obtained by the GPS module 302 (corresponding to the "position information" in the claims) and IMU data obtained by the IMU module 303 (corresponding to the "inclination information" in the claims). Note that the sensor information may also include altitude data obtained by the altimeter 304 (corresponding to the "altitude information" in the claims) and the like.

When the imaging instruction signal is transmitted from the mobile object 100 to the imaging device 200, the imaging device 200 which has received the signal starts exposure, and after a predetermined exposure time elapses, the exposure ends and an image is acquired. Also, asynchronously from the imaging instruction and the exposure timing, the sensor device 300 periodically acquires GPS data with the GPS module 302 at predetermined time intervals, and in addition, periodically acquires IMU data with the IMU module 303 at predetermined time intervals. The timings at which the GPS module 302 acquires GPS data and the timings at which the IMU module 303 acquires IMU data may be asynchronous or synchronous. Note that when new GPS data and IMU data is acquired, all of the old data preferably is saved without being deleted.

First, when an imaging instruction signal is transmitted from the mobile object 100 to the imaging device 200, the imaging device 200 starts exposure, and when exposure ends after a predetermined exposure time elapses, an image is acquired, while in addition, the exposure notification signal indicating the timing of the end of exposure is transmitted from the imaging device 200 to the sensor device 300.

Upon receiving the exposure notification signal, the sensor device 300 transmits the GPS data obtained at the timing closest to the timing when the exposure notification signal has been received to the imaging device 200. Also, upon receiving the exposure notification signal, the sensor device 300 similarly transmits the IMU data obtained at the timing closest to the timing when the exposure notification signal has been received to the imaging device 200.

As described above, the timings of the exposure by the imaging device 200 and the timings of the acquisition of GPS data and IMU data in the sensor device 300 are asynchronous, and therefore the timing at which the sensor device 300 receives the exposure notification signal from the imaging device 200 does not necessarily match the timings at which the sensor device 300 acquires the GPS data and the IMU data. Consequently, the sensor device 300 transmits the (most recent) GPS data and the IMU data acquired at the timing closest to the timing when the exposure notification signal has been received to the imaging device 200.

In the case of FIG. 9, because the acquisition of GPS data A is performed at a point in time when the sensor device 300 receives the exposure notification signal indicating the exposure for acquiring image data A, when the acquisition of the GPS data A is completed, the sensor device 300 transmits the GPS data A to the imaging device 200. Similarly, because the acquisition of IMU data A is performed at a point in time when the sensor device 300 receives the exposure notification signal indicating the exposure for acquiring the image data A, when the acquisition of the IMU data A is completed, the sensor device 300 transmits the IMU data A to the imaging device 200. In this way, the GPS data A and the IMU data A acquired at the timing closest to the timing of receiving the exposure notification signal are transmitted from the sensor device 300 to the imaging device 200.

Subsequently, the information processing unit 250 saves the GPS data A and the IMU data A as metadata in association with the image A in the storage unit 207.

When the mobile object 100 transmits the next imaging instruction signal to the imaging device 200, the imaging device 200 performs exposure similarly, and when the exposure ends, an image B is acquired by imaging and in addition, an exposure notification signal is transmitted to the sensor device 300. In the case of FIG. 9, because the acquisition of GPS data B is performed at a point in time when the sensor device 300 receives the exposure notification signal indicating the exposure for acquiring image data B, when the acquisition of the GPS data B is completed, the sensor device 300 transmits the GPS data B to the imaging device 200. Similarly, because the acquisition of IMU data B is performed at a point in time when the sensor device 300 receives the exposure notification signal indicating the exposure for acquiring the image data B, when the acquisition of the IMU data B is completed, the sensor device 300 transmits the IMU data B to the imaging device 200. In this way, the GPS data B and the IMU data B acquired at the timing closest to the timing of receiving the exposure notification signal are transmitted from the sensor device 300 to the imaging device 200. Subsequently, the information processing unit 250 saves GPS data B and IMU data B as metadata in association with the image B in the storage unit 207.

In this way, all captured images are saved in the storage unit 207 while being associated with sensor information.

Note that the transmission of the exposure notification signal that triggers the association between an image and sensor information may also be performed at some timing between the timing at which the imaging device 200 is instructed to perform imaging and the exposure end timing. Also, the transmission of the exposure notification signal may also be performed at some timing between the timing at which the imaging device 200 starts preparations for exposure and the exposure end timing. This is effective in a case where there is a time lag between receiving the imaging instruction signal and making exposure preparations. Also, the transmission of the exposure notification signal may also be performed at some timing between the exposure start timing and the exposure end timing of the imaging device 200. In this case, GPS information acquired at a timing closer to the captured image can be obtained. A specific example of the period between the exposure start timing and the exposure end timing is the timing when exposure starts or the timing when exposure ends.

In this way, by acquiring GPS data with the exposure timing of the imaging device 200 as a trigger, GPS data closer to the timing of the exposure can be acquired, and therefore more accurate GPS data can be imparted to the image. For example, compared to the case of extracting feature points of images and joining the images together while cross-checking the feature points to create a composite image, because the GPS data and the IMU data associated with the images are correlated in a state of high time precision, it is possible to join images by relying on the GPS data and the IMU data only. Therefore, a faster composite image creation process becomes possible. In this way, in the present technology, a composite image can be created without requiring a process of extracting and cross-checking feature points of images.

Figure 10:
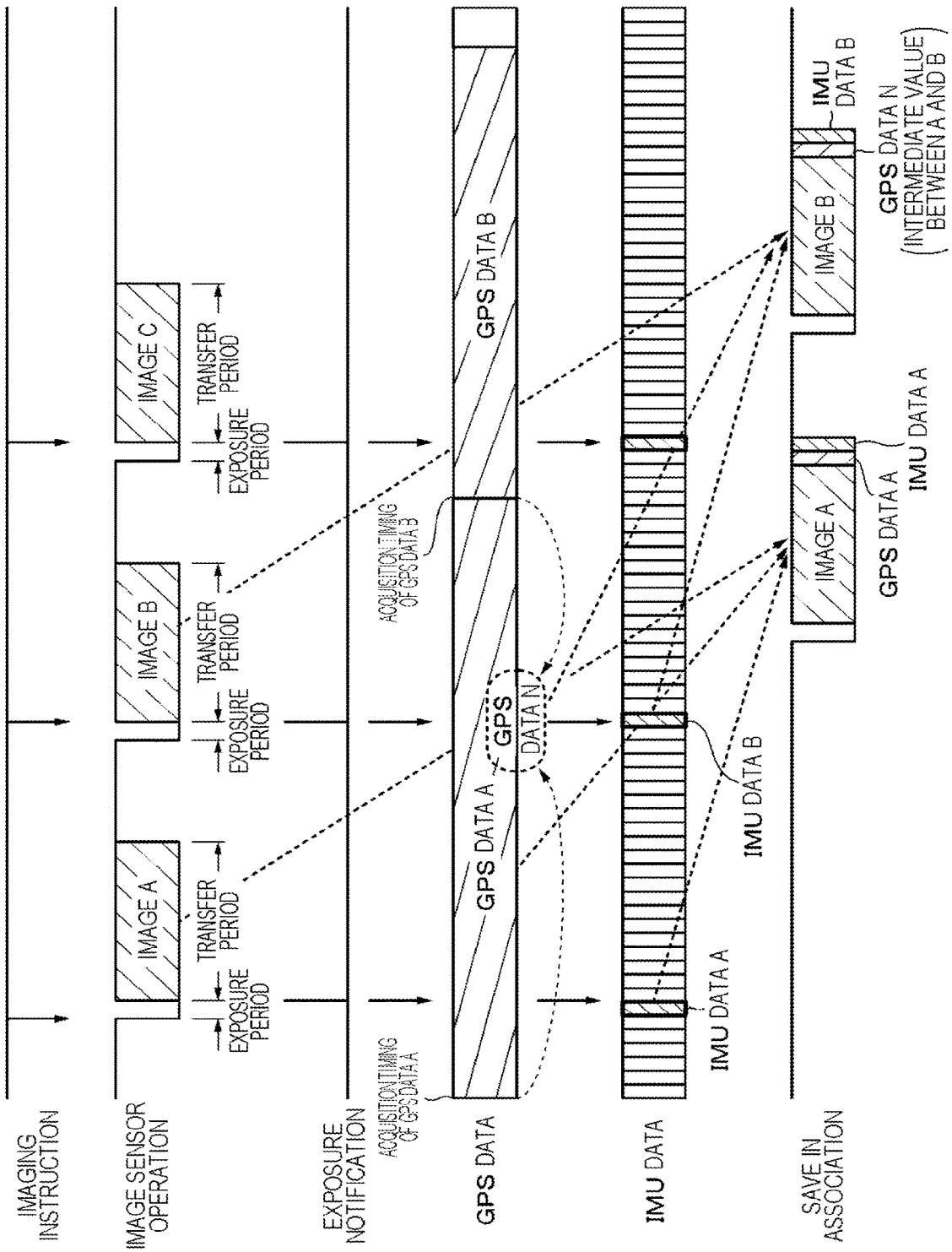
FIG. 10 is a diagram for explaining an association of images and sensor information.

Herein, FIG. 10 will be referenced to describe a case of computing new GPS data of higher accuracy from GPS data A and GPS data B acquired before and after the exposure timing. In the case of the example in FIG. 10, new GPS data may be computed from GPS data A and GPS data B acquired before and after the timing of receiving the exposure notification signal for acquiring an image A, and the new GPS data may be treated as the GPS data to associate with the image A.

For example, in a case where the timing of receiving the exposure notification signal is midway between (in a 5:5 proportion of) the timing of acquiring the GPS data A and the timing of acquiring the GPS data B, intermediate values between the GPS data A and the GPS data B are computed by a weighted average or the like and treated as new GPS (sensor information) to be associated with the image A. In FIG. 10, the new GPS data is denoted as the "GPS data N". Note that in this case, the new GPS data N is transmitted from the sensor device 300 to the imaging device 200 after the acquisition of the GPS data B. This computation of new sensor information from a plurality of sensor information is not limited to GPS data, and can be applied to all sensor information handled by the present technology, such as IMU data and altitude data.

Note that the timing that acts as the reference for associating GPS data and IMU data with an image is not limited to when the exposure ends. The reference timing may also be the timing of the imaging instruction by the mobile object 100 or the imaging device 200 itself, or the timing at which exposure starts.

[1-8. Composite Image Creation Process]

Next, the process of creating a composite image from a plurality of images captured by the imaging device 200 will be described. The composite image creation process is performed in the external terminal device 400 and/or cloud 500. However, the composite image creation process may be performed by the imaging device 200 in a case where the information processing unit 250 of the imaging device 200 has sufficient processing power to execute the composite image creation process.

Figure 11:
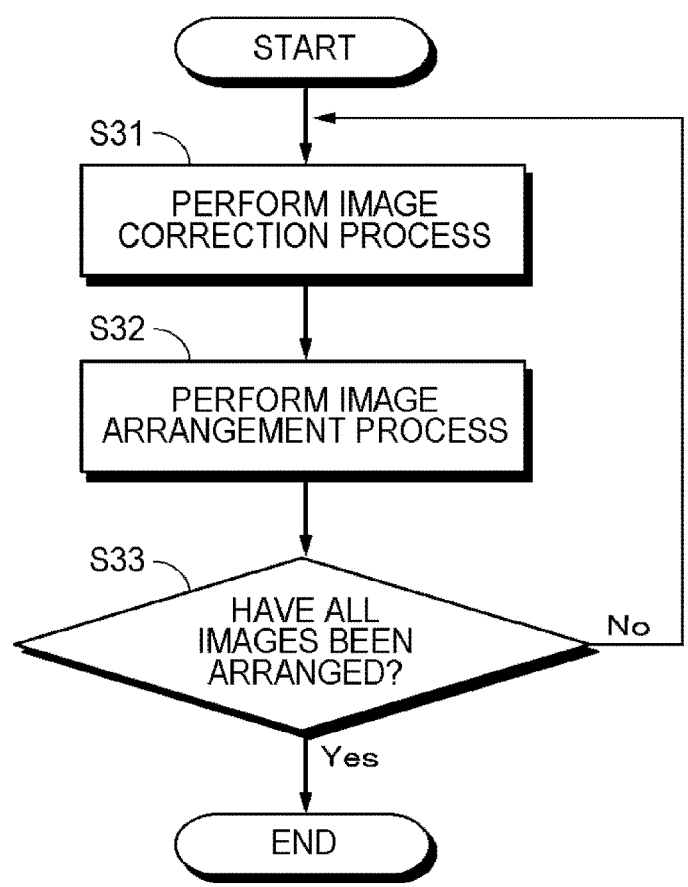
FIG. 11 is a flowchart illustrating the flow of a composite image creation process.

First, the flowchart in FIG. 11 will be referenced to describe the flow of the composite image creation process. In step S31, a correction process is performed on one of the images used for creating a composite image. The correction process is a process of correcting an image on the basis of the sensor information associated as metadata with the image. Details of the correction process will be described later.

Next, in step S32, a process of arranging the corrected image to create the composite image is performed. Details of the arrangement process will be described later. Next, in step S33, it is determined whether or not the arrangement process has been performed on all images. In a case where the arrangement process has not been performed on all images, the process proceeds to step S31, and steps S31 to S33 are repeated until all images are arranged (step S33, No).

Subsequently, in a case where it is determined that the arrangement process has been performed on all images in step S33, the process ends and the composite image is completed (step S33, Yes).

Figure 12:
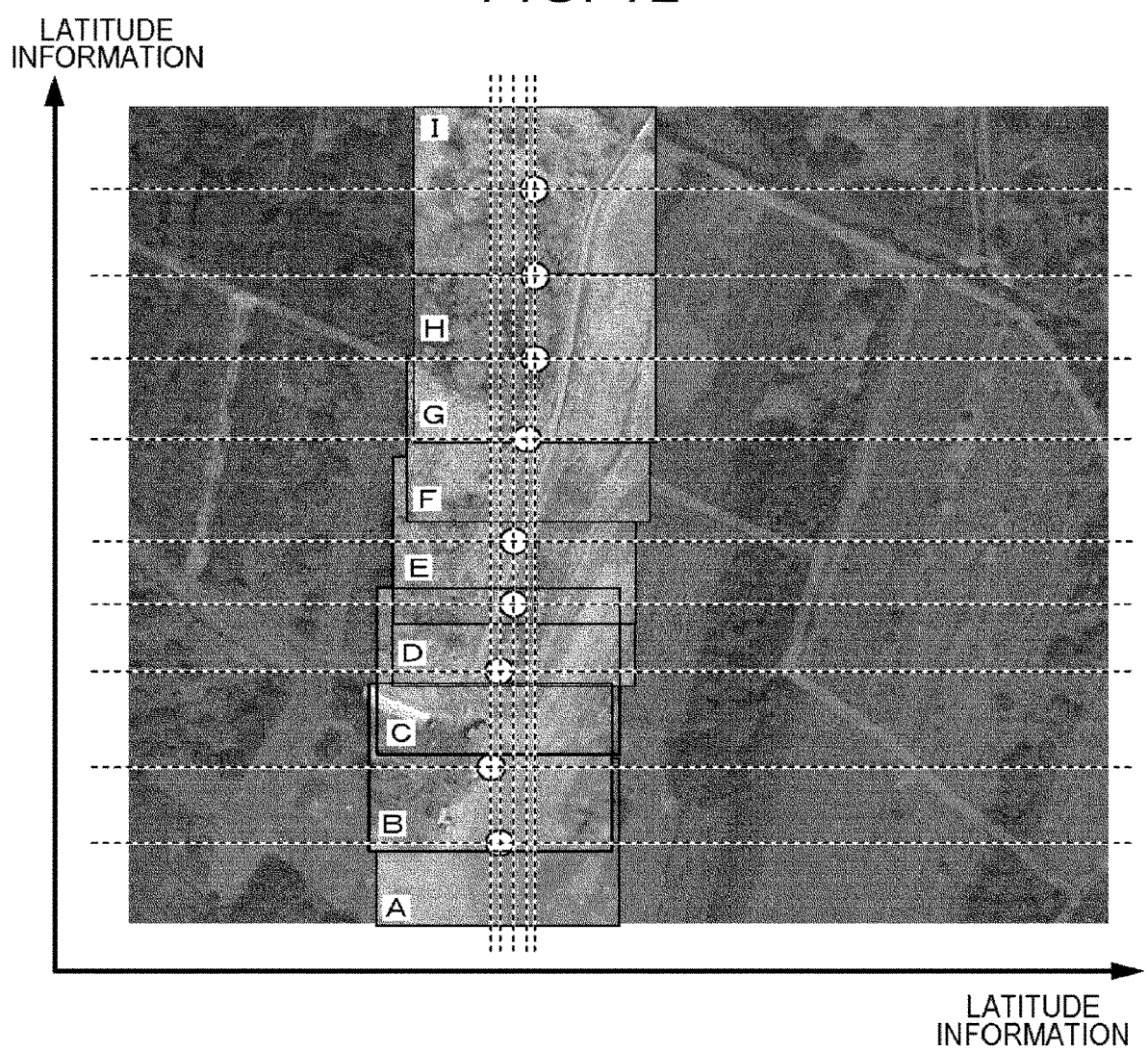
FIG. 12 is a diagram illustrating an example of a composite image created by the composite image creation process.

FIG. 12 is an illustration of a composite image created using a plurality of images by arranging the images such that adjacent images partially overlap. Note that the example of FIG. 12 assumes that the composite image is a map of farmland created using a plurality of images captured by imaging the farmland from the sky.

In FIG. 12, for the sake of convenience in the explanation, a frame has been drawn around some images (an image A to an image I) among the plurality of images that form the created map image, and the shading of these images has been altered. The points on the image A to the image I are the positions of the latitude and longitude indicated by the GPS data associated with each image, and the dashed lines indicate the latitude and longitude of each image.

In the composite image creation process, images are arranged while correcting the positions of the images on the basis of the GPS data associated as metadata with each image. In the flight plan and the imaging plan, the imaging positions are arranged in a straight line as illustrated in FIG. 7 and the imaging range is also preset, and ideally imaging will be performed in accordance with the plans. However, in actual imaging, it is considered that the imaging positions and the imaging range tend to diverge from the imaging plan in many cases due to the influence of wind and the like.

Accordingly, in the present technology, the images are arranged by treating the GPS data as a reference. The method of arranging images by treating the GPS data as a reference may be a method of arranging the images by aligning the latitude and longitude in map data associated with latitude and longitude information with the latitude and longitude indicated by the GPS data associated with the images. For the map data, map data associated with latitude and longitude data issued by the Geospatial Information Authority of Japan or map data associated with latitude and longitude data provided by a map service on the Internet can be used.

As described above, the imaging by the imaging device 200 mounted to the mobile object 100 is based on the flight plan and the imaging plan in advance, and at which position (imaging position) and over which range (imaging range) to capture images are predetermined. In a case where an actually captured image diverges from the predetermined imaging position and imaging range, correction is performed using the GPS data.

Figure 13:
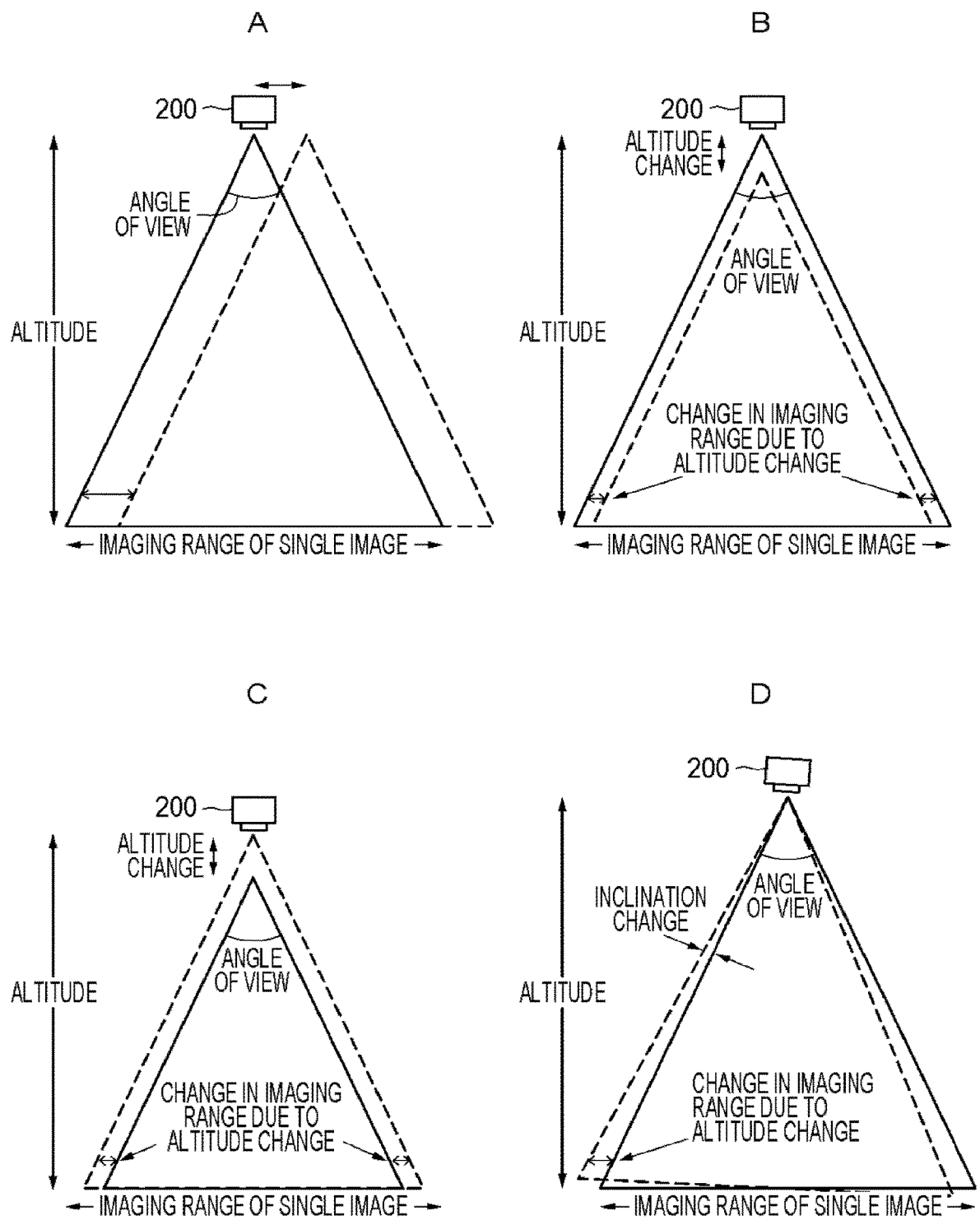
FIG. 13 is a diagram for explaining a process of correcting an image based on sensor information.

In the map image of FIG. 12, because images A, B, and C have matching longitudes, the images A, B, and C are arranged in the latitudinal direction without longitudinal misalignment. An image D is divergent from the imaging position in the imaging plan, and therefore there is longitudinal misalignment between the image C and the image D in the latitudinal direction. Accordingly, as illustrated in FIG. 13A, the image is moved in parallel from the imaging position in the imaging plan to the position of the GPS data associated with the image to correct the arrangement position of the image when creating the map image. Because the GPS data is latitude and longitude information about the imaging position, the image is arranged such that the GPS data acting as metadata of the image and the actual latitude and longitude are aligned.

Also, in a case where an image is captured at a higher position than the height of the mobile object 100 in the flight plan, as illustrated in FIG. 13B, the subject becomes smaller and the angle of view becomes wider compared to the case of performing imaging according to the flight plan and the imaging plan. In this case, correction is performed by performing an enlargement process such that the image matches the size of the subject obtained in the case of performing imaging according to the flight plan and the imaging plan. Subsequently, the image subjected to the correction process is arranged to create the composite image.

On the other hand, in a case where an image is captured at a lower position than the height of the mobile object 100 in the flight plan, as illustrated in FIG. 13C, the subject becomes larger and the angle of view becomes narrower compared to the case of performing imaging according to the flight plan and the imaging plan. In this case, correction is performed by performing a reduction process such that the image matches the size of the subject obtained in the case of performing imaging according to the flight plan and the imaging plan, and subsequently the image subjected to the correction process is arranged to create the composite image.

Also, in the case of creating a two-dimensional composite image using images, it is desirable to perform the imaging by the imaging device 200 substantially parallel with the farmland. However, in a case where the mobile object 100 or the imaging device 200 is inclined while imaging, an error occurs in the imaging range as illustrated in FIG. 13D. In this case, correction is performed by performing keystone correction and a trimming process such that the image matches the subject obtained in the case of performing imaging substantially parallel with the land according to the flight plan and the imaging plan. Subsequently, the image subjected to the correction process is arranged to create the composite image.

Furthermore, in a case where illuminance sensor data is associated as metadata with an image, a correction may also be performed to adjust the brightness, color balance, and the like of the image on the basis of the illuminance sensor data. Note that a correction process does not have to be performed on an image that does not require correction.

In this way, a composite image is created by arranging all of the images while also correcting the images on the basis of the sensor information associated as metadata with the images. Note that the metadata associated with each of the images forming the composite image preferably remain associated with the created composite image. With this arrangement, a position of interest specified by the user in the composite image can be easily specified on the basis of GPS data or the like.

Note that a composite image may also be created without using map data associated with latitude and longitude information by treating the latitude and longitude indicated by the GPS data of the image arranged first as a reference by which to arrange the second and subsequent images.

According to the present technology, a process of extracting and cross-checking feature points of images is not required to create a composite image, and therefore the amount of computational processing required to create a composite image can be reduced. With this arrangement, a composite image can be created more quickly than in the past, and moreover, a composite image can be created even on an inexpensive computer whose processing power is not high.

In the present technology, because a process of extracting and cross-checking feature points of images is not required to create a composite image, the present technology is useful in the creation of composite images of broad areas like farmland that lack buildings or the like to act as conspicuous features, for example.

Also, because the images captured on the basis of the flight plan and the imaging plan are used, the regions where the images are overlapped with each other to create a composite image can be made small. With this arrangement, a composite image can be created with fewer images compared to the techniques of the past. Also, the time needed for composite image creation can be shortened compared to the techniques of the past. The fact that the regions where the images are overlapped with each other to create a composite image are made small means that the spacing between the back-and-forth flight routes of the mobile object 100 for imaging can be widened, and the imaging efficiency can be enhanced. If the imaging efficiency is enhanced, the area that can be imaged in a single flight can be expanded compared to the past under the same battery conditions. Also, being able to create a composite image with fewer images than the technology of the related art means that battery can be saved because imaging can be performed a fewer number of times than the technology of the related art.

With the configuration in which the imaging device 200 and the sensor device 300 are mounted to the mobile object 100, the present technology can be realized by mounting the imaging device 200 and the sensor device 300 to a mobile object 100 such as an ordinary drone on the market that is not provided with special functions for the present technology. Therefore, bringing a product according to the present technology to the market and user adoption are also easy.

Because the created composite image is furnished with the metadata has been associated with the images forming the composite image, in the case of a map image of farmland, problem sites such as poor growth, diseases, and insects can be grasped as position information by relying on GPS data. Therefore, it is also possible to sprinkle water, apply fertilizer, administer agricultural chemicals, and the like to specified regions utilizing a tractor equipped with a GPS function.

Note that the present technology does not exclude the creation of a composite image by extracting and cross-checking feature points of images to overlap the images with each other. A composite image may also be created by jointly using a method of extracting and cross-checking feature points.

2. Second Embodiment

[2-1. Overview of Composite Image Creation According to Second Embodiment]

Next, a second embodiment of the present technology will be described. The second embodiment performs high-precision composite image creation by using the elevation of the ground surface in the imaging range. Elevation refers to the height of the ground surface from a reference level in a case where the mean sea level of a sea that acts as a reference (in Japan, Tokyo Bay) is treated as the reference level of 0 m. First, FIGS. 14 and 15 will be referenced to describe an overview of composite image creation according to the second embodiment.

Figure 14:
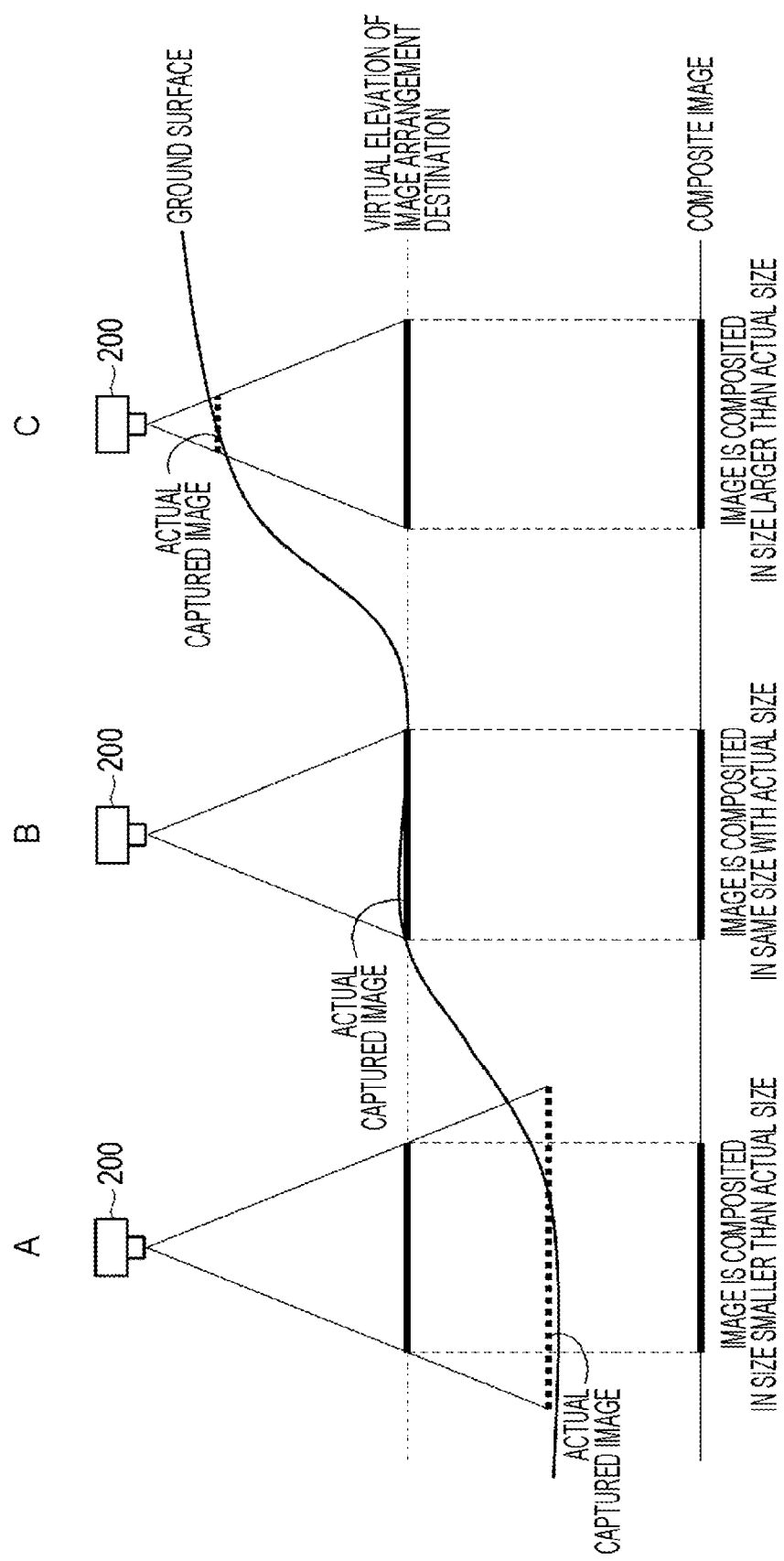
FIG. 14 is a diagram explaining an overview of composite image creation in a case of not using elevation.

FIG. 14 is an illustration of the relationship between the height of the imaging device 200 (the height of the flight of the mobile object 100), the ground surface, an image, and an image arrangement result in the case of not reflecting a change in the elevation of the ground level in composite image creation. As illustrated in FIG. 14, a composite image is created by projecting and arranging a plurality of images obtained by imaging onto a virtual plane different from the ground surface. The plane in which the images are arranged is a plane common to all of the images. Note that the height of the imaging device 200 (the height of the flight of the mobile object 100) is assumed to be fixed.

Consider the case of assuming that the elevation of the arrangement destination of all of the images obtained by imaging is the same height without reflecting the elevation of the ground surface, and creating a composite image by arranging the images with a predetermined equal size. In this case, if there is a change in the elevation of the ground surface, an error will occur in the arranged image size, and the image will be arranged to appear larger (or smaller) than the actual image size.

As illustrated in FIG. 14A, in a case where the elevation of the ground surface is lower than the plane in which the image is arranged, the image will be composited at a smaller size than the size of the actual image. Also, as illustrated in FIG. 14C, in a case where the elevation of the ground surface is higher than the plane in which the image is arranged, the image will be composited at a larger size than the size of the actual image. In a case where there is a change in the elevation of the ground surface in this way, an error occurs in the arrangement of images in the composite image creation. This error is small in a case where the ground surface and the plane in which the image is arranged are close, but becomes larger as the ground surface and the plane in which the image is arranged get farther apart.

Figure 15:
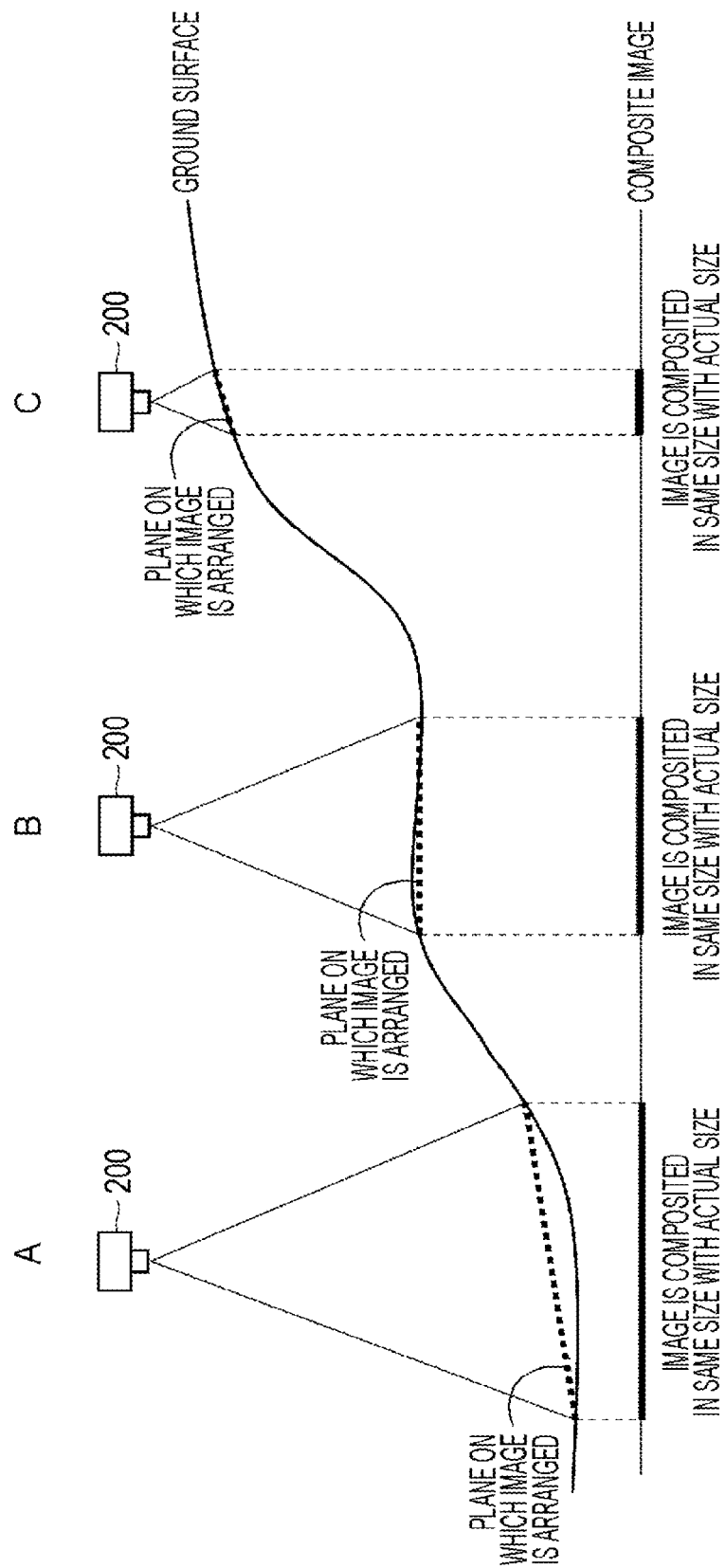
FIG. 15 is a diagram explaining an overview of composite image creation according to a second embodiment.

In contrast, in the second embodiment, by acquiring the elevation of the imaging range of the image and arranging the image in a plane according to the elevation as illustrated in FIG. 15, a composite image is created by arranging the image at the correct size. With this arrangement, a high-precision composite image can be created with higher accuracy. Note that the second embodiment is described by treating the flight altitude of the mobile object 100 as being fixed.

Regarding the elevation of the ground surface, map data in which elevation is associated with positions indicated by latitude and longitude or the like issued by the Geospatial Information Authority of Japan or map data associated with elevation provided by a map service on the Internet can be used. In addition, the elevation can also be acquired with a ranging sensor.

[2-2. Overall Process According to Second Embodiment]

Next, an overview of the overall process from the flight of the mobile object 100 and the imaging by the imaging device 200 to the image compositing process according to the second embodiment will be described. The mobile object 100, the imaging device 200, the sensor device 300, the terminal device 400, and the cloud 500 forming the image processing system 1000 are similar to the first embodiment, and therefore a description is omitted.

Figure 16:
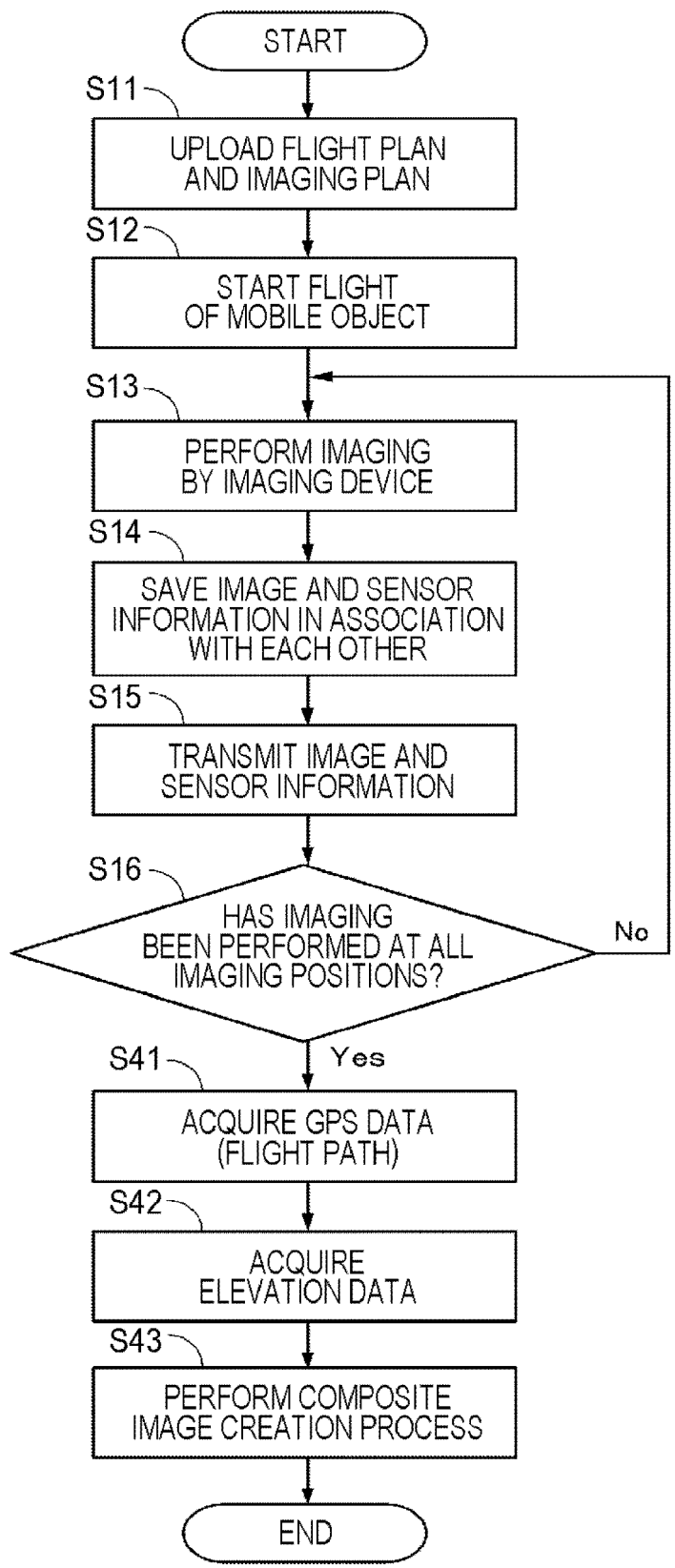
FIG. 16 is a flowchart illustrating an overall process according to the second embodiment.

FIG. 16 is a flowchart illustrating the flow of the overall process from the flight of the mobile object 100 to imaging, the acquisition of the elevation of the ground surface, and the composite image creation process. Processes that are the same as the flowchart in FIG. 6 are denoted with the same step numbers, and a detailed description is omitted.

First, in step S11, a preprogrammed flight plan is uploaded to the control unit 101 of the mobile object 100, while in addition, a preprogrammed imaging plan is uploaded to the control unit 201 of the imaging device 200. Next, in step S12, the flight of the mobile object 100 is started. Note that while in flight, similarly to that described in the first embodiment, the sensor device 300 periodically acquires sensor information such as GPS data and IMU data at predetermined time intervals, respectively.

Additionally, when steps S13 to S16 are repeated and imaging as well as the acquisition of sensor information are performed at all imaging positions, the process proceeds to step S41 (step S16, Yes). Note that steps S41 to S43 are a process performed by the terminal device 400 and/or the cloud 500 performing the composite image creation process after the flight of the mobile object 100 ends.

Next, in step S41, the terminal device 400 and/or the cloud 500 performing the composite image creation process acquire/acquires GPS data indicating the position of the mobile object 100 in flight from the GPS module 302 of the sensor device 300. This GPS data may be considered to indicate a flight path of the mobile object 100. The GPS data is acquired by the GPS module 302 while the mobile object 100 is in flight, and is acquirable by reading out information saved in a memory function inside the sensor device 300 or the storage unit 207 of the imaging device 200 after the flight ends.

Note that the GPS data may also be GPS data acquired by the GPS module 102 provided in the mobile object 100.

Next, in step S42, elevation data in the imaging range of the ground surface is acquired. This elevation data is also included in the sensor information. First, a method of acquiring the elevation data using map data or the like in which latitude and longitude are associated with elevation will be described.

In this case, the terminal device 400 and/or the cloud 500 performing the image compositing process acquire/acquires the elevation data in the imaging range of the imaging device 200 on the basis of the positions indicated by the GPS data acquired in step S41. The above can be performed by using map data or the like issued by the Geospatial Information Authority of Japan, in which positions such as latitudes and longitudes are associated with elevation, to confirm the elevation at the latitudes and longitudes indicated by the GPS data acquired in step S41.

As illustrated in FIG. 17, the acquired elevation data of the ground surface is numbered in the order of the positions where the GPS data has been acquired and is associated with the positions indicated by latitude and longitude to create a database. This association of the data acquisition positions, the positions indicated by latitude and longitude, and the elevation data will be referred to as the elevation database. Note that, as described with reference to FIG. 9 in the first embodiment, the images captured by the imaging device 200 are saved in association with sensor information such as GPS data and IMU data. Consequently, the elevation data and the images can be associated by referencing the latitude and longitude associated with the elevation data.

When the acquisition of elevation data is completed, next, in step S43, the composite image creation process is performed.

At this point, a method of acquiring elevation data in the imaging range of the ground surface by using a ranging sensor in step S42 of the flowchart in FIG. 16 will be described. Assume that an acronym for "light detection and ranging" or "laser imaging, detection and ranging" (LiDAR) sensor is used as the ranging sensor. LiDAR refers to one type of remote sensing technology using light, and is a technology capable of measuring the distance to a distant target and analyzing the properties of the target by measuring scattered light with respect to laser radiation emitted in pulses.

In the second embodiment, as illustrated in FIG. 18A, the sensor device 300 is provided with a LiDAR sensor 310. However, because LiDAR measures distance by laser radiation, as illustrated in FIG. 18B, a laser radiation unit 311 and a laser reception unit 312 of the LiDAR sensor 310 are provided on the bottom of the fuselage 1 of the mobile object 100 such that a laser directed straight down at the ground surface can be radiated and received. Note that insofar as it is possible to radiate and receive a laser directed at the ground surface, the laser radiation unit 311 and the laser reception unit 312 of the LiDAR sensor 310 may be provided on a side face of the fuselage 1 of the mobile object 100.

In the case of using LiDAR, it is preferable that before imaging the ground surface, the mobile object 100 to which the sensor device 300 provided with the LiDAR sensor 310 is mounted is made to fly over the same range as the imaging range and acquire the elevation data of the imaging range. The computation of elevation data from the information acquired by LiDAR is performed after the flight of the mobile object 100 ends. However, the elevation data may also be computed from the information acquired by the LiDAR sensor 310 in parallel with the flight of the mobile object 100 and the imaging of the ground surface. The computation of elevation data from the information acquired by the LiDAR sensor 310 is described as being performed by the information processing unit 250, but may also be performed by the terminal device 400 or the cloud 500.

Note that the interval between the elevation data acquisition timings by the LiDAR sensor 310 preferably is shorter than the interval between the imaging timings by the imaging device 200. This is because if the interval between imaging timings is longer than the interval between elevation data acquisition timings, associating accurate elevation data with each captured image becomes difficult. Furthermore, this is because as the interval between elevation data acquisition timings becomes shorter, a more accurate elevation of the ground surface can be obtained.

Acquiring elevation data of the ground surface by LiDAR and associating the elevation data with positions indicated by latitude and longitude to create a database is similar to the case of acquiring elevation data from map data.

Note that the timings at which elevation data is acquired with the LiDAR sensor 310 may or may not be synchronized with the timings at which the sensor device 300 acquires sensor information such as GPS data. In a case where the acquisition timings are synchronized, GPS data and the like included in the sensor information acquired at the same timing as the elevation data acquired with the LiDAR sensor 310 can be associated. In a case where the acquisition timings are not synchronized, an image, sensor information, and elevation data may be associated by treating a timing related to the image capture as a reference, such as the timing of the imaging instruction or the timing when the exposure notification signal is received from the imaging device 200. This association is described as being performed by the information processing unit 250, but may also be performed by the terminal device 400 or the cloud 500.

Figure 19:
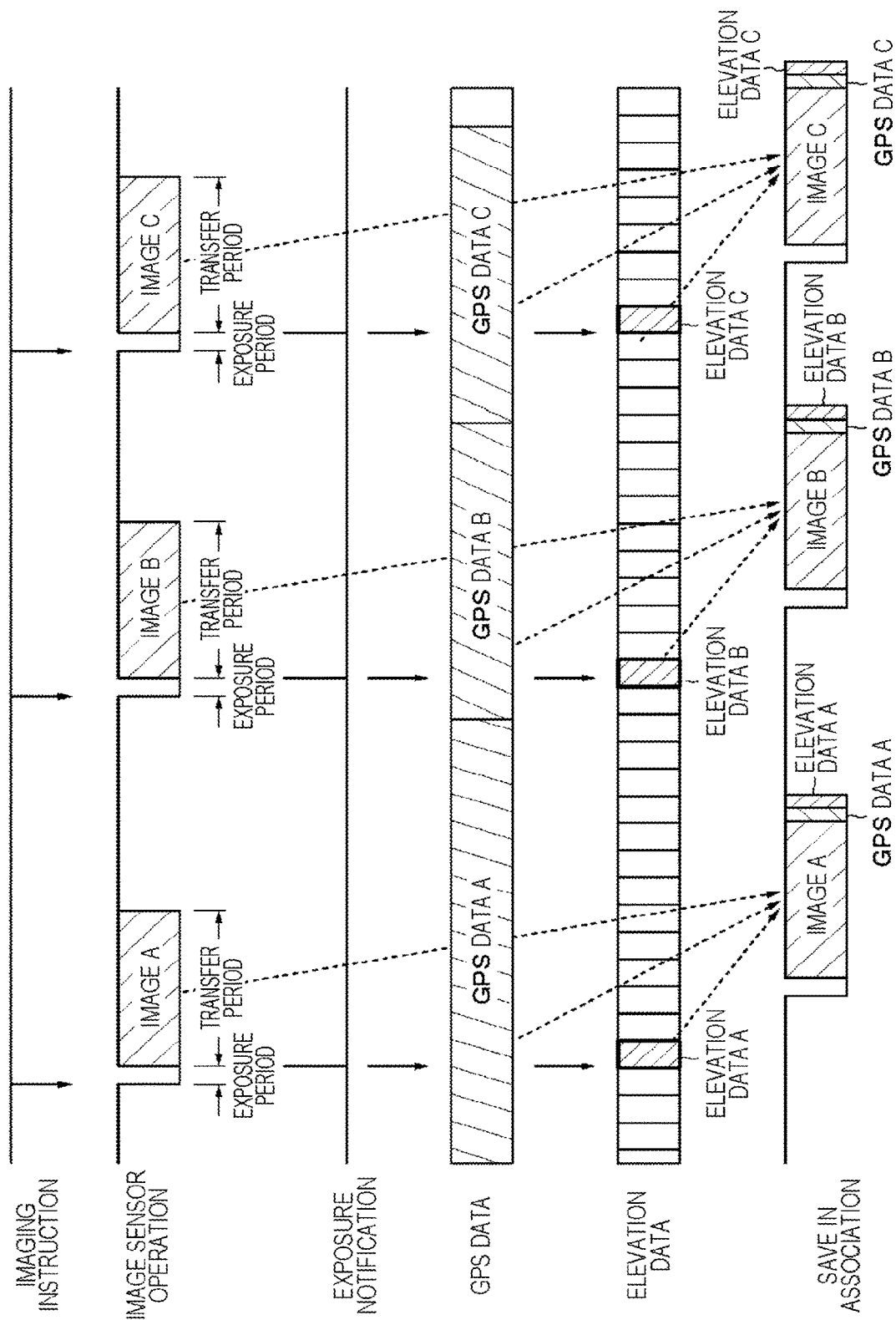
FIG. 19 is a diagram for explaining an association of images, GPS data, and elevation data.

For example, as illustrated in FIG. 19, in a case where the acquisition of elevation data A is performed at a point in time when the sensor device 300 receives the exposure notification signal indicating the exposure for acquiring image data A, when the acquisition of the elevation data A is completed, the sensor device 300 transmits the elevation data A to the imaging device 200. In this way, the elevation data A acquired at the timing closest to the timing of receiving the exposure notification signal is transmitted from the sensor device 300 to the imaging device 200. Subsequently, the information processing unit 250 saves the GPS data A, the IMU data A, and also the elevation data A as metadata in association with the image A in the storage unit 207. By associating an image, GPS data, IMU data, and elevation data in this way, the elevation data can be used when arranging the image to create a composite image. Note that in cases where the positions at which elevation data is acquired with the LiDAR sensor 310 are predetermined or the positions at which elevation data is acquired with the LiDAR sensor 310 are acquired with GPS data, it is also possible to associate the elevation data with GPS data and the like included in the sensor information on the basis of information about the elevation data acquisition positions.

Note that likewise in the case of acquiring elevation data by referencing map data, in a case where elevation data is acquired from map data in parallel with the flight of the mobile object 100, the imaging by the imaging device 200 and the acquisition of GPS data and IMU data by the sensor device 300, the image, the sensor information and the elevation data may be associated in this way. Note that in FIG. 19, GPS data and elevation data are illustrated for the sake of convenience in the explanation, but the data to be associated is not limited to these, and may also include IMU data obtained by the IMU module 303, altitude data obtained by the altimeter 304, and the like.

Figure 20:
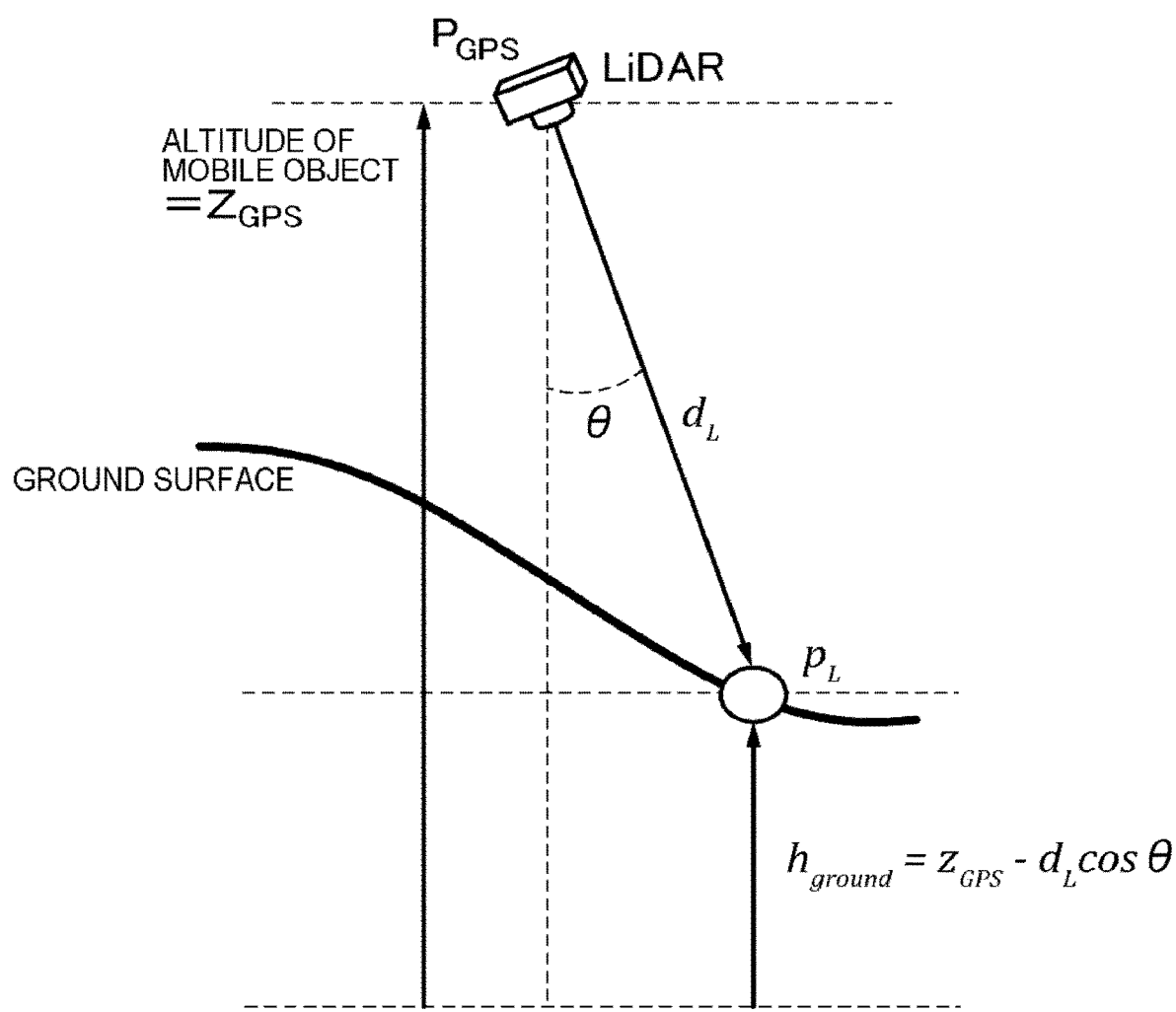
FIG. 20 is an explanatory diagram of a method of computing the elevation of a ground surface in the case of using LiDAR.

Next, FIG. 20 will be referenced to describe a method of computing elevation data indicating the elevation of the ground surface in the case of using LiDAR. This computation of elevation data may be performed by any of the information processing unit 250, the terminal device 400, and the cloud 500, and may also be performed by the LiDAR sensor 310 itself. In a case where the LiDAR ranging direction has an angle of e with respect to the gravity direction and the measured distance is $d_L$, provided that $Z_{GPS}$ is the height of the mobile object 100 in ranging obtained from the GPS data, a ground surface elevation hground is computed according to Formula 1 below.

$$h\text{ground} = Z_{GPS} - d_L \cos\theta \quad \text{[Formula 1]}$$

Also, the position of a ranging target point $P_L$ having the elevation hground can be computed from the distance and azimuth between the position of the mobile object ($P_{GPS}$) and $P_L$ by using the GPS data and the IMU data indicating the position and attitude of the mobile object 100, and the ranging result of the LiDAR sensor 310. A specific method of calculating the latitude and longitude of $P_L$ using the distance and azimuth from $P_{GPS}$ is described in public reference literature [Geospatial Information Authority of Japan Technical Report B5-No. 19], and this method can be used. The elevation computed in this way is used as elevation data in the image compositing process.

[2-3. Composite Image Creation Process]

Figure 21:
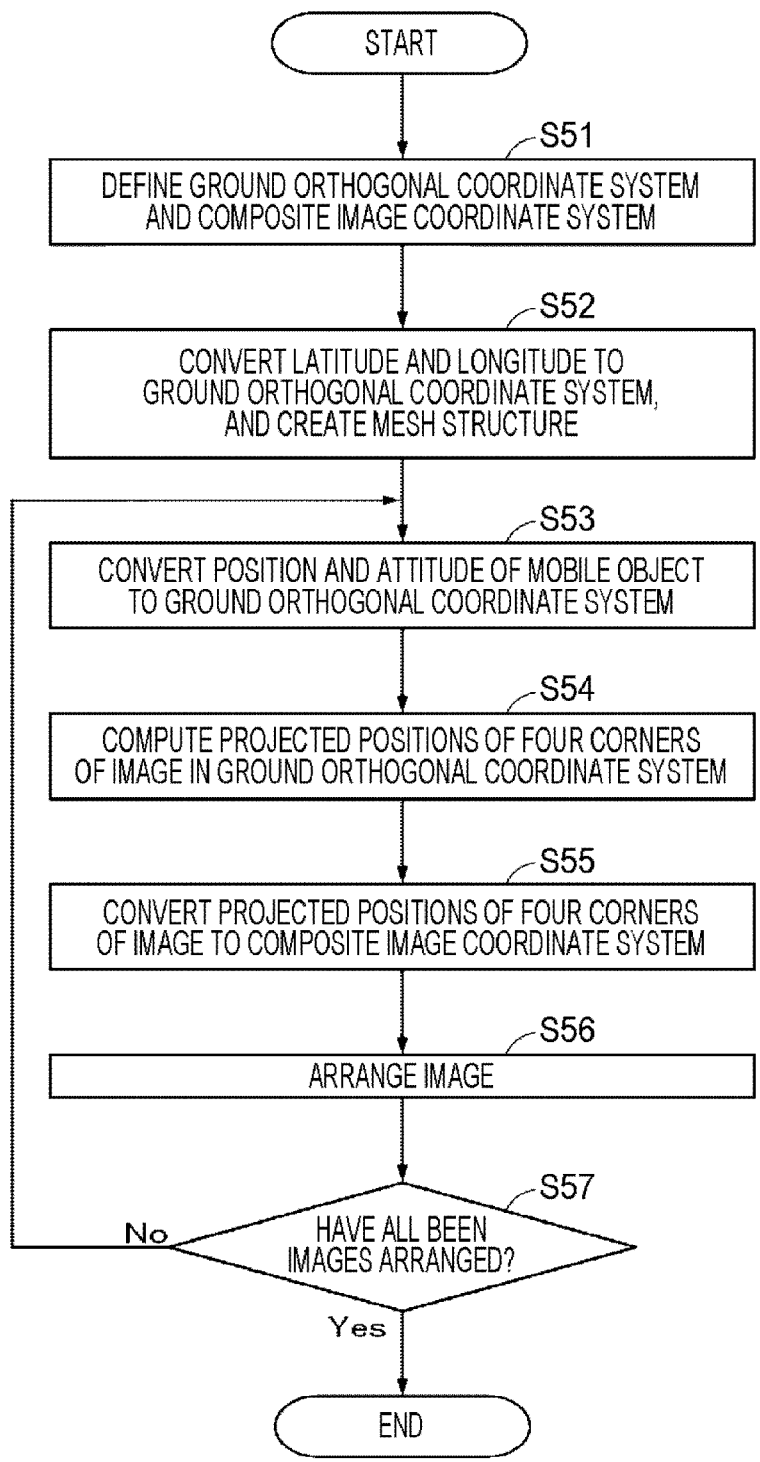
FIG. 21 is a flowchart illustrating the composite image creation process.

Next, the flowchart in FIG. 21 will be referenced to describe details of the composite image creation process. The composite image creation process is similar in both the case of acquiring the elevation data of the ground surface from map data and in the case of acquiring the elevation data by LiDAR.

First, in step S51, two coordinate systems to be used in the composite image creation process are defined. The coordinate systems to be defined are a ground orthogonal coordinate system $\Sigma_G$ that expresses the imaging range of the imaging device 200 in association with the movement of the mobile object 100 in an orthogonal coordinate system, and a composite image coordinate system $\Sigma_I$ that acts as the arrangement destination of images for image compositing. The ground orthogonal coordinate system $\Sigma_G$ corresponds to the "first coordinate system" in the claims, while the composite image coordinate system $\Sigma_I$ corresponds to the "second coordinate system".

Figure 22:
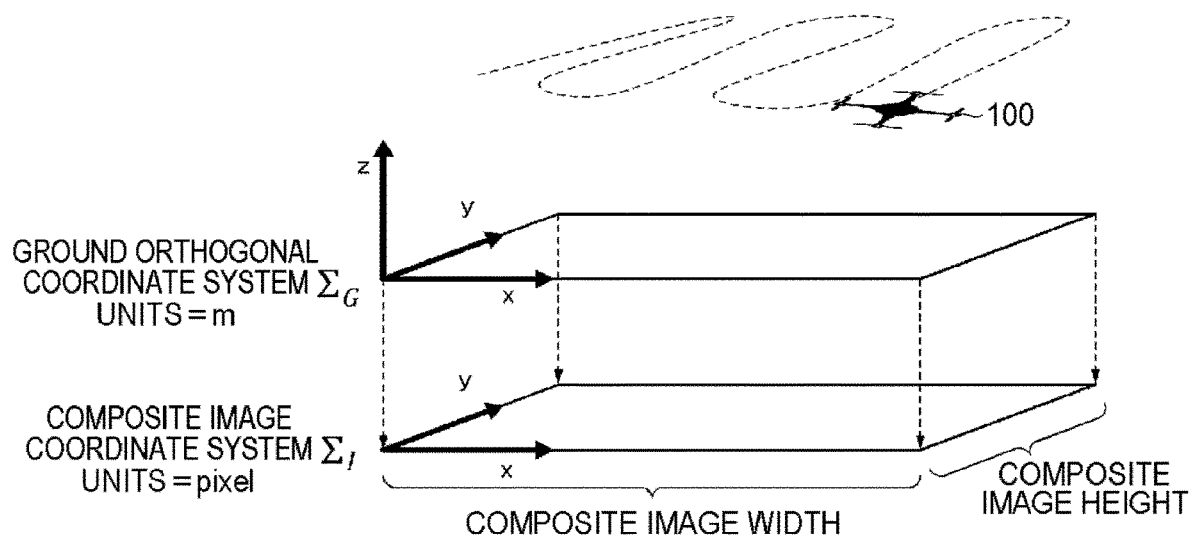
FIG. 22 is an explanatory diagram of a ground orthogonal coordinate system and a composite image coordinate system.

The ground orthogonal coordinate system $\Sigma_G$ and the composite image coordinate system $\Sigma_I$ are illustrated in FIG. 22. The origin of the ground orthogonal coordinate system $\Sigma_G$ is expressed in units of meters as an arbitrary point in the imaging range at an elevation of 0 m. Regarding the directions of the XYZ axes of the ground orthogonal coordinate system $\Sigma_G$, the +X direction is treated as east, the +Y direction is treated as north, and the +Z direction is treated as vertically upward. The composite image coordinate system $\Sigma_I$, being an image coordinate system, is defined in units of pixels, and is configured such that the entire imaging range is contained and also such that images do not jut out. However, the pixel width and the pixel height of the images can be set to any resolution.

Next, in step S52, the latitudes and longitudes in the elevation database illustrated in FIG. 17 are converted to the ground orthogonal coordinate system $\Sigma_G$. The conversion method is illustrated in FIG. 23. First, from the origin $P_G$ of the ground orthogonal coordinate system $\Sigma_G$ and an arbitrary position $P_{hi}$ from among a plurality of positions corresponding to the elevation data and the latitudes and longitudes illustrated in FIG. 17, a distance d and an azimuth θ between the two points are computed. A method of computing the distance d and azimuth θ between two points from the latitude and longitude is described in public reference literature [Geospatial Information Authority of Japan Technical Report B5-No. 19], and this method can be used.

When the distance d and the azimuth θ are computed, the coordinates (x, y) of the arbitrary position $P_{hi}$ in the ground orthogonal coordinate system $\Sigma_G$ is determined as (d·cos θ, d·sin θ). Furthermore, if the height of the original elevation data is treated as the height of $P_{hi}$, the value of $P_{hi}$ in the ground orthogonal coordinate system $\Sigma_G$ can be decided.

Additionally, in step S52, the elevation database converted to the ground orthogonal coordinate system $\Sigma_G$ is used to create a mesh structure illustrated in FIG. 24. The mesh structure is created by joining each of the neighboring points included in the elevation database to create triangles. Each piece of triangle mesh information configured in this way is used in the computation of the projected positions of the four corners of an image described later.

Next, in step S53, the position of the mobile object 100 indicated by the GPS data acquired by the GPS module 102 of the mobile object 100 and the attitude of the mobile object 100 indicated by the IMU data acquired by the IMU module 103 are converted to the ground orthogonal coordinate system $\Sigma_G$. Because the position of the mobile object 100 is output as latitude and longitude information according to GPS data, conversion to the ground orthogonal coordinate system $\Sigma_G$ is necessary, but the conversion method is similar to the conversion of the elevation database to the ground orthogonal coordinate system $\Sigma_G$ in step S52.

Figure 25:
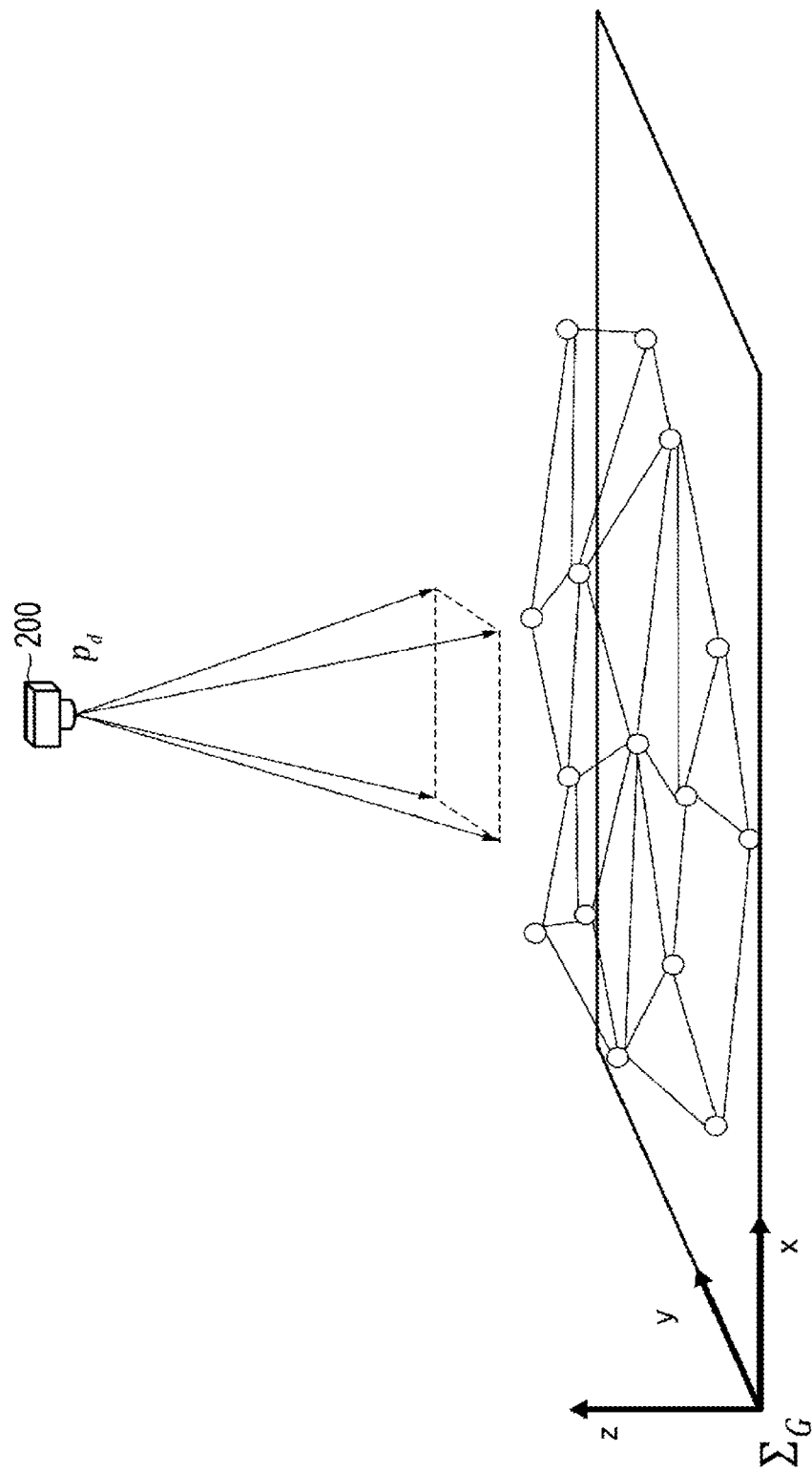
FIG. 25 is a diagram illustrating vectors to the four corners of an image and a mesh structure.

Next, in step S54, the projected positions of the four corners of an image onto the ground surface are computed in the ground orthogonal coordinate system $\Sigma_G$. The four corners of an image refer to the vertices of the four angles included in an image having a quadrilateral shape. FIG. 25 is an illustration of vectors to the four corners of an image extending from the imaging device 200 mounted to the mobile object 100 and the elevation (mesh structure) of the ground surface. The points where the vectors extending to the four corners of the image and the mesh plane intersect become the projected positions of the four corners of the image to be computed.

Here, the method of computing the projected positions of the four corners of the image will be described. Note that the following description is a method of computing the projected position of one of the four corners of the image. By performing this method on all four corners, the projected positions of all four corners of the image can be computed.

Figure 26:
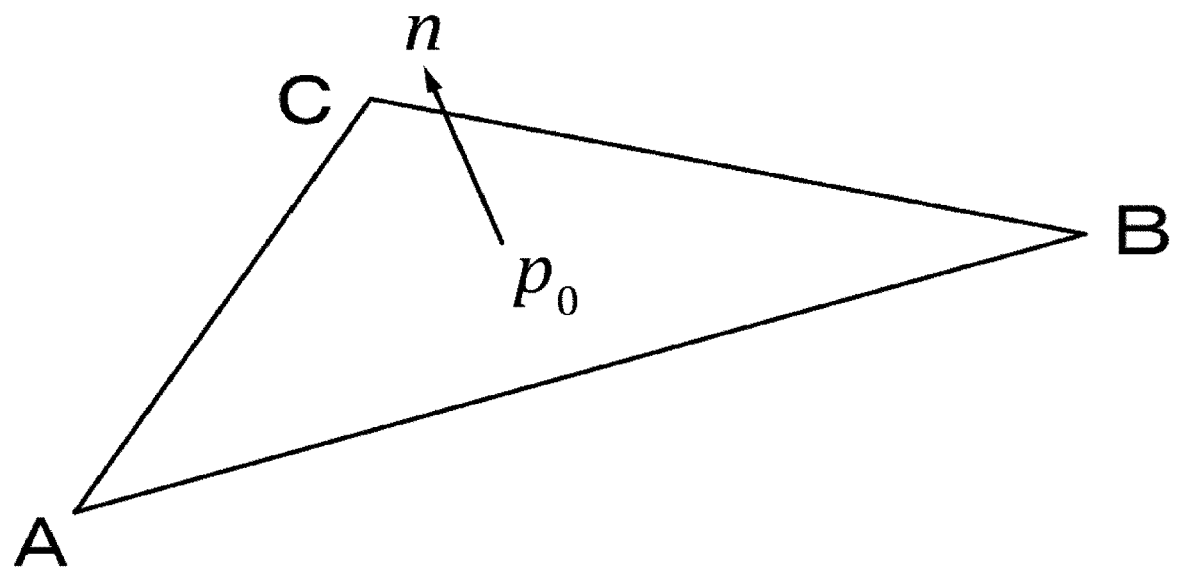
FIG. 26 is a diagram explaining a method of computing a shadow position of a corner of an image.

First, as illustrated in FIG. 26, consider a plane ABC of a triangular mesh acting as the minimum unit of elevation data. Provided that n is the unit normal vector of the plane ABC and $P_0$ is the center coordinate of ABC, n is computed from the cross product using Formula 2 as illustrated in FIG. 26.

$$n = \frac{\overline{AB} \times \overline{AC}}{|\overline{AB}| \times |\overline{AC}|} \quad \text{[Formula 2]}$$

Next, as illustrated in FIG. 27A, the position of the imaging device 200 of the mobile object 100 is regarded as $P_d$ and a unit vector extending from the focal point of the imaging device 200 to four corner points of the image is regarded as L. Note that in actuality, four unit vectors L exist, but in FIG. 27A, only one is illustrated for the sake of convenience in the explanation. In the case of assuming that the plane ABC and a vector extending from the position $P_d$ of the imaging device 200 have an intersection point, the vector can be expressed as dL using a scalar value d.

Herein, if the expression of an arbitrary point P in the plane ABC as $(P-P_0) \cdot n = 0$ is utilized, a point $L_i$ where the vector dL and the plane ABC intersect can be computed using Formula 3 below.

$$(dL + P_d - P_0) \cdot n = 0 \quad \text{[Formula 3]}$$

$$d = \frac{(P_0 - P_d) \cdot n}{L \cdot n}$$

$$L_i = P_d + dL = P_d + \frac{(P_0 - P_d) \cdot n}{L \cdot n} L$$

Additionally, it is investigated whether or not the intersection point $L_i$ between the plane ABC and the vector ($L_0$, dL) is contained in the plane ABC. As illustrated in FIG. 27B, in a case where the intersection point Li is contained in the plane ABC, Li is treated as the projected position of one corner of the image.

By performing this process on all vectors to the four corners of the image, the projected positions of the four corners of the image onto the ground surface can be computed.

Figure 28:
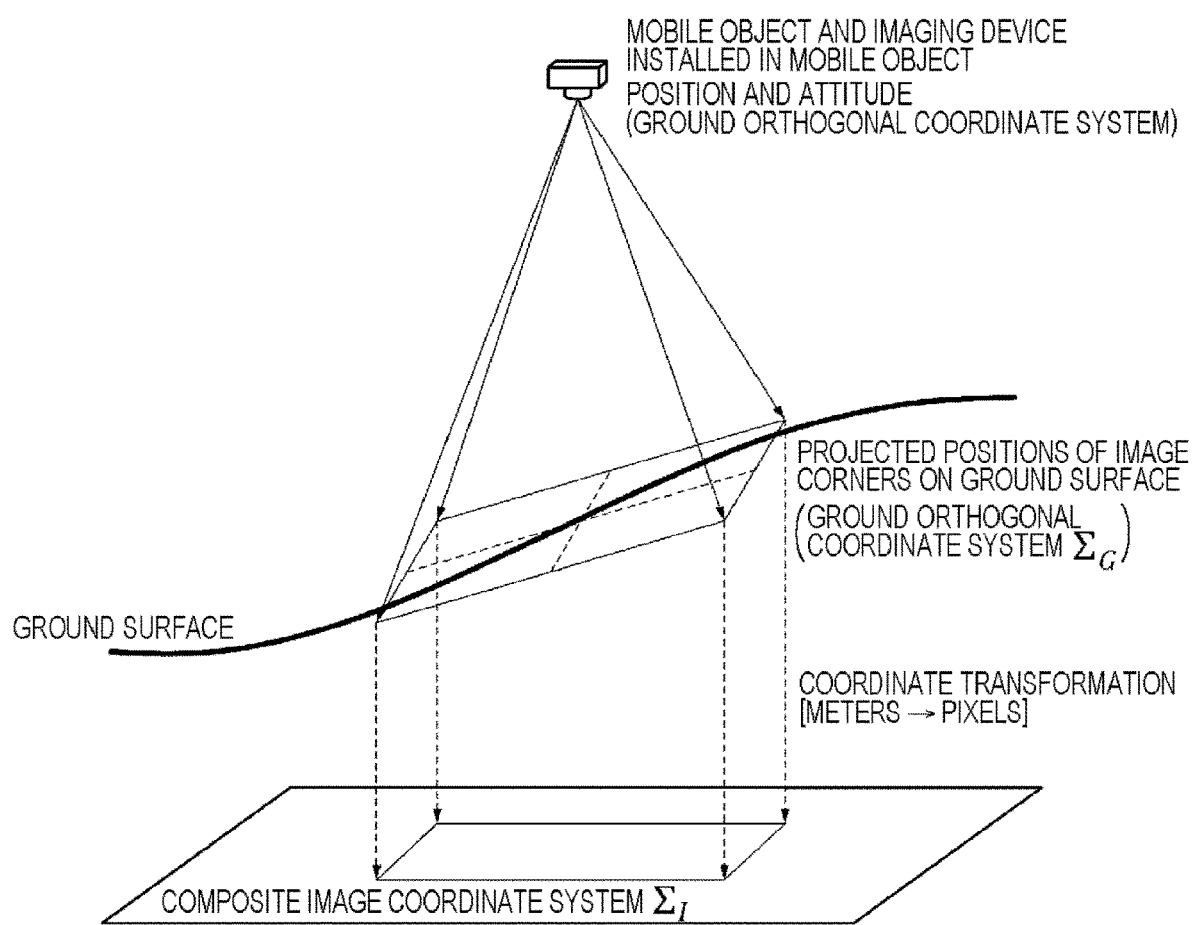
FIG. 28 is a diagram explaining a conversion of the shadow positions of the four corners of an image to the composite image coordinate system.

Returning to the description of the flowchart in FIG. 21. Next, in step S55, the projected positions of the four corners of the image computed in step S54 are converted to the composite image coordinate system $\Sigma_I$. For the conversion, the ground orthogonal coordinate system $\Sigma_G$ and the composite image coordinate system $\Sigma_I$ defined in step S51 are used. FIG. 28 is a conceptual diagram of the conversion of the ground orthogonal coordinate system $\Sigma_G$ and the composite image coordinate system $\Sigma_I$ as well as the arrangement of an image. By converting the projected position of each of the four corners of the image in the ground orthogonal coordinate system $\Sigma_G$ to the composite image coordinate system $\Sigma_I$, the image is projected onto the composite image coordinate system $\Sigma_I$ and arranged as illustrated in FIG. 28. With this arrangement, images are arranged with the actual image sizes as it is as described with reference to FIG. 15, and images are not composited by being arranged in sizes different from the sizes of the actual captured images as illustrated in FIG. 14.

Next, in step S56, the image is arranged on the basis of the projected positions of the four corners of the image onto the composite image coordinate system $\Sigma_I$ computed in step S55. When arranging the image, a projective transformation to the four corners of the image computed in step S55 is performed. To arrange the image correctly, it is necessary to project the four corners of the image correctly, but because the elevation data of each position inside the imaging range indicated in the elevation database does not indicate the elevation at all positions of the ground surface, the elevations indicated in the elevation data do not necessarily indicate the elevations of the four corners of the image. Therefore, the image is arranged by computing each of the positions of the four corners of the image in the ground orthogonal coordinate system $\Sigma_G$ and converting and projecting these positions onto the composite image coordinate system $\Sigma_I$ in this way. With this arrangement, images can be arranged with correct sizes to create a composite image.

Subsequently, in step S57, it is determined whether or not the process from step S53 to step S56 has been performed on all images and the images have been arranged. In a case where not all images have been processed, the process proceeds to step S53, and steps S53 to S57 are repeated until all images are arranged (step S57, No). Subsequently, in a case where all images have been arranged, the process ends, and a single composite image containing a plurality of captured images is completed (step S57, Yes).

As described above, the composite image creation process according to the second embodiment is performed. Note that although the present embodiment uses a LiDAR sensor as the ranging sensor, any type of sensor may be used insofar as the sensor is capable of measuring distance. Also, the present embodiment describes the case of acquiring the elevation of the ground surface from map data and the case of acquiring the elevation of the ground surface with a ranging sensor, but the elevation of the ground surface may also be acquired by another method. For example, there is also a method of computing parallax from two images (stereo images) obtained by imaging the same scene with imaging devices 200 mounted to the mobile object 100, using triangulation to compute the distance to a target (the ground surface), and computing the difference in the distance to the altitude of the mobile object 100 and the ground surface as the elevation of the ground surface. Any type of technique can be adopted insofar as the elevation of the ground surface can be computed.

Note that images may also be arranged by assuming that the elevation data at the position closest to the position indicated by the GPS data associated with an image is the elevation of all four corners of the image.

As described above, in the second embodiment, the size of each image to be arranged becomes different according to the elevation of the ground surface. Therefore, in the case of creating a composite image by arranging a plurality of images, there is a possibility that gaps may occur between images. However, by shortening the interval between each imaging to increase the overlap between images in the direction of the distance between imaging positions (the direction of travel of the mobile object 100) illustrated in FIG. 7, the occurrence of gaps can be prevented. Also, by shortening the distance between flight routes to increase the overlap between images in the direction of the distance between flight routes of the mobile object 100 illustrated in FIG. 7, the occurrence of gaps can be prevented. The above may also be built into the flight plan by referencing map data in advance before the flight of the mobile object 100 for imaging. Also, the elevation of the ground surface may be acquired in real-time with a ranging sensor such as LiDAR in parallel with the flight of the mobile object 100 and imaging, and the flight program of the mobile object 100 may be changed in real-time on the basis of the elevation to increase the overlapping portions.

In the embodiments, the flight altitude of the mobile object 100 is described as fixed. However, it is conceivable that the flight altitude will change in actual flight of the mobile object 100. Therefore, a correction may be performed according to a change in altitude of the mobile object 100 obtained by the GPS module 102 of the mobile object 100.

3. Modifications

The foregoing specifically describes embodiments of the present technology, but the present technology is not limited to the foregoing embodiments, and various modifications based on the technical ideas of the present technology are possible.

The drone that acts as the mobile object 100 is not limited to one provided with rotors as described in the embodiments, and may also be a so-called fixed-wing aircraft.

The mobile object 100 according to an embodiment of the present technology is not limited to a drone, and may also be an automobile, a marine vessel, a robot, or the like that moves automatically without being piloted by a human being.

The present technology is not limited to the case of causing a drone to fly and capture images from the sky, and is also applicable to a case in which the imaging device 200 and the sensor device 300 are loaded onboard a marine vessel acting as the mobile object, undersea images are captured while moving by the marine vessel, and a map of the ocean floor is created as the composite image.

Additionally, the present technology is also applicable to a case in which the imaging device 200 and the sensor device 300 are mounted to an automobile acting as the mobile object, a landscape is imaged by the imaging device 200 pointed to the side, and a panoramic photograph of the landscape along the road is created as the composite image.

In a case where the imaging device 200 is not mounted to the mobile object 100 through a camera mount that functions as a gimbal, and instead is mounted securely in a fixed state, the attitude of the mobile object 100 and the attitude of the imaging device 200 become equal. In this case, because the inclination of the mobile object 100 and the inclination of the imaging device 200 become equal, it is sufficient for an IMU module to be provided in any one of the mobile object 100, the sensor device 300, and the imaging device 200. Note that even in the case of using a camera mount that functions as a gimbal, it is possible to estimate the attitude of the imaging device 200 by working together with an angle control of the camera mount, for example. In this case, it is sufficient for an IMU module to be provided in any one of the mobile object 100, the sensor device 300, and the imaging device 200.

The imaging device 200 is not limited to the one provided with a single image sensor, and may also be provided with a plurality of, that is two or more of, image sensors. For example, a first image sensor can be treated as an image sensor for visible light, while a second image sensor can be treated as an image sensor for infrared radiation. With this arrangement, multiple types of composite images can be created in a single imaging. For example, in the case of creating a map image obtained by imaging farmland from the sky using infrared images, by checking the chlorophyll of crops from the map image, the state of the crops can be checked. In addition, the imaging device 200 may also be a multispectral camera that acquires images in a plurality of different wavelength regions (wavelength bands), and can also be used for the purpose of checking a vegetation index such as the normalized difference vegetation index (NDVI).

In the embodiments, the imaging device 200 and the sensor device 300 are mounted to the mobile object 100 as a separate device, but the imaging device 200 and the sensor device 300 may also be configured as an integrated device and mounted to the mobile object 100. Additionally, the mobile object 100 may also be configured to be provided with the functions of the imaging device 200 and the sensor device 300 in advance.

The terminal device 400 and/or the cloud 500 may also receive the images captured by the imaging device 200 and the sensor information acquired by the sensor device 300, and associate the images with the sensor information.

Any type of device may be used as the imaging device 200, such as a digital camera, a smartphone, a mobile phone, a portable game console, a laptop PC, or a tablet terminal, insofar as the device is provided with an imaging function and can be mounted to the mobile object 100.

The imaging device 200 may also be provided with an input unit, a display unit, and the like. In addition, the imaging device 200 may also be usable as a standalone imaging device in a case where of not being connected to the mobile object 100.

The imaging device 200 also may be provided with a battery, and electric power may be configured to be supplied from the battery 6 of the imaging device 200 to the mobile object 100 and the sensor device 300.

Alternatively, all of the mobile object 100, the imaging device 200, and the sensor device 300 may be provided with batteries.

Additionally, the present technology may also be configured as below.

(1)

An information processing device configured to:

acquire an image captured according to an imaging instruction by an imaging device mounted to a mobile object;

acquire sensor information including position information about the mobile object from a sensor device according to a signal transmitted from the imaging device in response to the imaging instruction; and associate the acquired sensor information with the acquired image.

(2)

The information processing device according to (1), in which the sensor information additionally includes altitude information about the mobile object.

(3)

The information processing device according to (1) or (2), in which the sensor information additionally includes inclination information about the mobile object.

(4)

The information processing device according to any one of (1) to (3), in which the signal indicates an exposure timing related to the capture of an image by the imaging device.

(5)

The information processing device according to any one of (1) to (4), in which the sensor information is most recent sensor information at a point in time of the exposure timing.

(6)

The information processing device according to any one of (1) to (5), in which the information processing device computes new sensor information from a plurality of the sensor information, and associates the new sensor information with the image.

(7)

The information processing device according to (4), in which the exposure timing is a timing of an end of an exposure that the imaging device performs to capture the image.

(8)

The information processing device according to (4), in which the exposure timing is a timing of a beginning of an exposure that the imaging device performs to capture the image.

(9)

The information processing device according to (4), in which the exposure timing is a timing at which an imaging instruction for the imaging device to capture the image is issued.

(10)

The information processing device according to any one of (1) to (9), in which the information processing device creates a composite image by arranging a plurality of the images on the basis of the sensor information.

(11)

The information processing device according to (10), in which the information processing device arranges the plurality of the image while correcting positions on the basis of the sensor information.

(12)

The information processing device according to (10), in which the sensor information additionally includes altitude information about the mobile object, and the information processing device arranges the image while enlarging or reducing the image on the basis of the altitude information.

(13)

The information processing device according to (10), in which the sensor information additionally includes inclination information about the mobile object, and the information processing device arranges the image while performing a keystone correction and/or a trimming process on the basis of the inclination information.

(14)

The information processing device according to any one of (1) to (13), in which the information processing device acquires elevation data indicating an elevation of a ground surface imaged by the imaging device, and associates the elevation data with information included in the sensor information.

(15)

The information processing device according to (14), in which the information processing device associates the elevation data with the image.

(16)

The information processing device according to (14) or (15), in which the elevation data is acquired from map data containing information about a position and an elevation, on the basis of the position information about the mobile object.

(17)

The information processing device according to (14) or (15), in which the elevation data is acquired on the basis of distance information acquired by a ranging sensor mounted to the mobile object.

(18)

The information processing device according to (17), in which the information processing device acquires elevation data from the ranging sensor according to a signal transmitted from the imaging device in response to the imaging instruction, and associates the acquired elevation data with information included in the sensor information.

(19)

An information processing method including:

acquiring an image captured according to an imaging instruction by an imaging device mounted to a mobile object;

acquiring sensor information including position information about the mobile object from a sensor device according to a signal transmitted from the imaging device in response to the imaging instruction; and associating the acquired sensor information with the acquired image.

(20)

An information processing program causing a computer to execute an information processing method including:

acquiring an image captured according to an imaging instruction by an imaging device mounted to a mobile object;

acquiring sensor information including position information about the mobile object from a sensor device according to a signal transmitted from the imaging device in response to the imaging instruction; and associating the acquired sensor information with the acquired image.

(21)

An image processing device configured to receive a supply of a plurality of images associated with sensor information including position information about a mobile object acquired according to a signal transmitted from an imaging device in response to an imaging instruction, and create a composite image by arranging the plurality of the images on the basis of the sensor information.

(22)

The image processing device according to (21), further configured to create the composite image by arranging the plurality of the images on the basis of elevation data indicating an elevation of a ground surface imaged by the imaging device.

(23)

The image processing device according to (22), in which the image processing device defines a first coordinate system corresponding to an imaging range of the imaging device in association with a movement of the mobile object and a second coordinate system corresponding to a plane in which the image is arranged, computes a projected position of the image on the ground surface in the first coordinate system on the basis of the sensor information and the elevation data, and arranges the image by converting the projected position to the second coordinate system.

(24)

The image processing device according to (23), in which the projected position of the image is computed for each of four corners of the image having a quadrilateral shape.

(25)

The image processing device according to (24), in which the image processing device arranges the image by converting the projected positions of the four corners of the image to the second coordinate system.

(26)

The image processing device according to any one of (22) to (25), in which the elevation data is acquired from map data containing information about a position and an elevation.

(27)

The image processing device according to (26), in which the elevation data is acquired by referencing map data containing information about a position and an elevation, on the basis of the position information about the mobile object.

(28)

The image processing device according to any one of (22) to (25), in which the elevation data is acquired by a ranging sensor mounted to the mobile object.

(29)

An image processing system including:
a mobile object;
an imaging device mounted to the mobile object;
a sensor device mounted to the mobile object and configured to detect sensor information including position information about the mobile object; and
an information processing device configured to associate the sensor information with an image captured by the imaging device.

(30)

The image processing system according to (29), in which the information processing device creates a composite image by arranging a plurality of the images on the basis of the sensor information.

(31)

The image processing system according to (29) or (30), further including: an image processing device configured to receive a supply of a plurality of the image captured by the imaging device and having the sensor information associated, and create a composite image by arranging the plurality of the images on the basis of the sensor information.

REFERENCE SIGNS LIST

100 Mobile object
200 Imaging device
300 Sensor device
250 Information processing unit
1000 Image processing system

The invention claimed is:

1. An information processing device, comprising:
processing circuitry configured to
    acquire an image captured according to an imaging instruction by an imaging device mounted on a mobile object,
    acquire sensor information including position information about the mobile object from a sensor device according to an exposure notification signal transmitted by the imaging device to the sensor device at a fixed timing that is relative to an exposure end timing of the captured image, the exposure notification signal being transmitted from the imaging device to the sensor device in response to the imaging instruction, and
    store the position information included in the acquired sensor information in association with the acquired image.

2. The information processing device according to claim 1, wherein
    the sensor information includes altitude information about the mobile object.

3. The information processing device according to claim 1, wherein
    the sensor information includes inclination information about the mobile object.

4. The information processing device according to claim 1, wherein
    the exposure notification signal indicates the exposure end timing related to the capture of the image by the imaging device.

5. The information processing device according to claim 4, wherein
    the sensor information is most recent sensor information at a point in time of the exposure end timing.

6. The information processing device according to claim 1, wherein
    the processing circuitry is further configured to compute new sensor information from the sensor information, and associate the new sensor information with the image.

7. The information processing device according to claim 4, wherein
    the fixed timing that is relative to the exposure end timing is the exposure end timing of an end of the exposure that the imaging device performs to capture the image, a timing of a beginning of the exposure that the imaging device performs to capture the image, or a timing at which the imaging instruction for the imaging device to capture the image is issued.

8. The information processing device according to claim 1, wherein
    the processing circuitry is further configured to create a composite image by arranging a plurality of images on a basis of the sensor information, the plurality of images including the acquired image.

9. The information processing device according to claim 8, wherein
    the processing circuitry is further configured to arrange the plurality of images while correcting positions on a basis of the sensor information.

10. The information processing device according to claim 8, wherein
    the sensor information includes altitude information about the mobile object, and
    the processing circuitry is further configured to arrange the acquired image while enlarging or reducing the acquired image on a basis of the altitude information.

11. The information processing device according to claim 8, wherein
    the sensor information includes inclination information about the mobile object, and
    the processing circuitry is further configured to arrange the acquired image while performing a keystone correction and/or a trimming process on a basis of the inclination information.

12. The information processing device according to claim 1, wherein
    the processing circuitry is further configured to acquire elevation data indicating an elevation of a ground surface imaged by the imaging device, and associate the elevation data with the sensor information.

13. The information processing device according to claim 12, wherein
the processing circuitry is further configured to associate the elevation data with the image.

14. The information processing device according to claim 12, wherein
the elevation data is acquired from map data containing information about a position and an elevation, on a basis of the position information about the mobile object.

15. The information processing device according to claim 12, wherein
the elevation data is acquired on a basis of distance information acquired by a ranging sensor mounted on the mobile object.

16. The information processing device according to claim 15, wherein
the processing circuitry is further configured to acquire the elevation data from the ranging sensor according to the exposure notification signal transmitted from the imaging device in response to the imaging instruction, and associate the acquired elevation data with the sensor information.

17. The information processing device according to claim 1, wherein the processing circuitry is configured to
acquire a plurality of images captured by the imaging device mounted on the mobile object, the plurality of images being used to construct a composite image and including the acquired image, and
the processing circuitry is configured to store position information for each of the plurality of images.

18. The information processing device according to claim 1, wherein
the imaging instruction is issued in accordance with an imaging plan;
the processing circuitry is configured to
acquire elevation data indicating an elevation of a ground surface imaged by the imaging device, and associate the elevation data with the sensor information, and
change the imaging plan based on the elevation data.

19. An information processing method, comprising:
acquiring an image captured according to an imaging instruction by an imaging device mounted on a mobile object;
acquiring sensor information including position information about the mobile object from a sensor device according to an exposure notification signal transmitted by the imaging device to the sensor device at a fixed timing that is relative to an exposure end timing of the captured image, the exposure notification signal being transmitted from the imaging device to the sensor device in response to the imaging instruction; and
storing the position information included in the acquired sensor information in association with the acquired image.

20. The information processing method according to claim 17, wherein
the imaging instruction is issued in accordance with an imaging plan; and
the information processing method further includes
acquiring elevation data indicating an elevation of a ground surface imaged by the imaging device,
associating the elevation data with the sensor information, and
changing the imaging plan based on the elevation data.

21. An image processing device, comprising:
processing circuitry configured to
receive a plurality of images with sensor information including position information, each position information being stored in association with a different one of the plurality of images and about a mobile object acquired according to an exposure notification signal transmitted by an imaging device to a sensor device at a fixed timing that is relative to an exposure end timing of the respective one of the plurality of images, the exposure notification signal being transmitted from the imaging device to the sensor device in response to an imaging instruction, and
create a composite image by arranging the plurality of images on a basis of the position information included in the sensor information.

22. The image processing device according to claim 21, wherein the processing circuitry is further configured to
create the composite image by arranging the plurality of images on a basis of elevation data indicating an elevation of a ground surface imaged by the imaging device.

23. The image processing device according to claim 22, wherein the processing circuitry is further configured to
define a first coordinate system corresponding to an imaging range of the imaging device in association with a movement of the mobile object and a second coordinate system corresponding to a plane in which one of the plurality of images is arranged,
compute a projected position of the one of the plurality of images on the ground surface in the first coordinate system on a basis of the sensor information and the elevation data, and
arrange the one of the plurality of images by converting the projected position to the second coordinate system.

24. The image processing device according to claim 22, wherein
the elevation data is acquired from map data containing information about a position and an elevation.

25. The image processing device according to claim 22, wherein
the elevation data is acquired by a ranging sensor mounted on the mobile object.

* * * * *